(12) United States Patent
Harl et al.

(10) Patent No.: US 9,254,061 B2
(45) Date of Patent: Feb. 9, 2016

(54) MICROWAVABLE BAG OR SHEET MATERIAL

(75) Inventors: Kara L. Harl, Naperville, IL (US); Jason R. Maxwell, Orland Park, IL (US)

(73) Assignee: The Glad Products Company, Oakland, CA (US)

( * ) Notice: Subject to any disclaimer, the term of this patent is extended or adjusted under 35 U.S.C. 154(b) by 1550 days.

(21) Appl. No.: 12/303,542

(22) PCT Filed: Jun. 4, 2007

(86) PCT No.: PCT/US2007/070349
§ 371 (c)(1),
(2), (4) Date: Dec. 4, 2008

(87) PCT Pub. No.: WO2007/146651
PCT Pub. Date: Dec. 21, 2007

(65) Prior Publication Data
US 2009/0200294 A1 Aug. 13, 2009

Related U.S. Application Data

(60) Provisional application No. 60/804,760, filed on Jun. 14, 2006.

(51) Int. Cl.
*H05B 6/80* (2006.01)
*H05B 6/64* (2006.01)
(Continued)

(52) U.S. Cl.
CPC ............ *A47J 36/027* (2013.01); *B65D 81/3461* (2013.01)

(58) Field of Classification Search
CPC ............... B65D 2581/3458; B65D 2581/3494; B65D 2581/3421; B65D 2581/344; B65D 2581/3483; B65D 2581/3472; B65D 2581/3485; B65D 2581/3416; B65D 2581/3424; B65D 2581/3444; B65D 2581/345; B65D 2581/3464; B65D 2581/3466; B65D 2581/3477; B65D 2581/3479; B65D 2581/3474; B65D 81/3461; B65D 81/3469; B65D 81/3897; B65D 81/3893; B65D 81/264; B65D 33/18; B65D 33/2591; B65D 2205/00; B65D 75/527; B65D 75/522; B65D 2313/02; B65D 2251/0015; B65D 33/01; A47J 36/027; A47J 36/022; Y10S 99/14
USPC ......... 219/725, 730, 731, 727, 728, 729, 759; 426/109, 111, 113, 241, 243, 234, 107; 383/105; 99/DIG. 14; 428/34.9, 35.2
See application file for complete search history.

(56) References Cited

U.S. PATENT DOCUMENTS 3,098,563 A 7/1963 Skees
4,020,141 A 4/1977 Quinn et al.
(Continued)

FOREIGN PATENT DOCUMENTS

EP 287324 B1 6/1993
EP 287323 B1 9/1993
(Continued)

*Primary Examiner* — Hung D Nguyen
(74) *Attorney, Agent, or Firm* — Thomas C. Feix; Stacy H. Combs

(57) ABSTRACT

A microwavable material having a structure that may be used to enhance the browning and crisping, and thus improve the taste and appearance, of a food item cooked therein. The material may be in the form of a sheet material or formed as a container such as a bag, pouch, or other suitable structure. The material may have one or more features that help bring the material into close contact with the food item and help conform the bag around the food item. Furthermore, the material may have a structure that avoids substantial contact with liquid released by a food item, may have a venting system suitable for the exiting of moisture, may have a coating, a transparent surface, and when formed as a container, may have a gusseted surface.

9 Claims, 40 Drawing Sheets

(51) Int. Cl.
  *B65D 81/34* (2006.01)
  *B65D 55/00* (2006.01)
  *A23L 1/01* (2006.01)
  *A47J 36/02* (2006.01)

(56) References Cited

U.S. PATENT DOCUMENTS

| | | | |
|---|---|---|---|
| 4,132,811 A | | 1/1979 | Standing et al. |
| 4,267,420 A | | 5/1981 | Brastad |
| 4,268,738 A | | 5/1981 | Flautt, Jr. et al. |
| 4,425,263 A | | 1/1984 | Nazarenko |
| 4,518,651 A | | 5/1985 | Wolfe, Jr. |
| 4,678,882 A | * | 7/1987 | Bohrer et al. ............ 219/730 |
| 4,735,513 A | | 4/1988 | Watkins et al. |
| 4,851,632 A | | 7/1989 | Kaliski |
| 4,950,859 A | * | 8/1990 | Anderson ............ 219/727 |
| 5,003,142 A | * | 3/1991 | Fuller ............ 219/730 |
| 5,006,405 A | | 4/1991 | Watkins et al. |
| 5,021,293 A | | 6/1991 | Huang et al. |
| 5,073,390 A | | 12/1991 | Knight, III et al. |
| 5,079,083 A | | 1/1992 | Watkins et al. |
| 5,081,330 A | | 1/1992 | Brandberg et al. |
| 5,084,601 A | | 1/1992 | Andreas et al. |
| 5,107,089 A | | 4/1992 | Beresniewicz et al. |
| 5,164,562 A | | 11/1992 | Huffman et al. |
| 5,177,332 A | * | 1/1993 | Fong ............ 219/730 |
| 5,180,894 A | | 1/1993 | Quick et al. |
| 5,217,768 A | | 6/1993 | Walters et al. |
| 5,285,040 A | | 2/1994 | Althausen et al. |
| 5,317,118 A | | 5/1994 | Brandberg et al. |
| 5,338,911 A | | 8/1994 | Brandberg et al. |
| 5,343,024 A | * | 8/1994 | Prosise et al. ............ 219/730 |
| 5,405,663 A | | 4/1995 | Archibald et al. |
| 5,500,235 A | | 3/1996 | Mendenhall et al. |
| 5,618,111 A | * | 4/1997 | Porchia et al. ............ 383/63 |
| 6,060,096 A | * | 5/2000 | Hanson et al. ............ 426/107 |
| 6,303,913 B1 | | 10/2001 | Bono et al. |
| 6,414,288 B1 | | 7/2002 | Bono et al. |
| 7,038,182 B2 | * | 5/2006 | Young et al. ............ 219/730 |
| 2002/0100755 A1 | * | 8/2002 | Peterson ............ 219/727 |
| 2003/0085224 A1 | | 5/2003 | Tsontzidis et al. |
| 2005/0279224 A1 | * | 12/2005 | Bergen ............ 99/426 |
| 2006/0177612 A1 | * | 8/2006 | Peterka ............ 428/34.9 |

FOREIGN PATENT DOCUMENTS

| | | | |
|---|---|---|---|
| EP | 429488 B1 | 9/1994 | |
| EP | 382399 B1 | 11/1994 | |
| EP | 340291 B1 | 2/1995 | |
| EP | 50684 B1 | 6/1995 | |
| EP | 451144 B1 | 9/1995 | |
| EP | 49613081 | 9/1995 | |
| EP | 504264 B1 | 5/1996 | |
| EP | 573127 B1 | 3/1997 | |
| EP | 615510 B1 | 3/1997 | |
| EP | 824482 B1 | 6/1999 | |
| JP | 7-41007 A | * | 2/1995 |
| WO | WO03/066435 A2 | 6/2003 | |

\* cited by examiner

MICROWAVABLE BAG OR SHEET MATERIAL

CROSS-REFERENCE TO OTHER APPLICATIONS

This application is a U.S. National Stage Filing under 35 U.S.C. §371 from International Application No. PCT/US2007/70349, filed Jun. 4, 2007, published as WO2007146651, on Dec. 21, 2007, which application claims benefit under 35 U.S.C. 119 (e) of U.S. Provisional Application Ser. No. 60/804,760, filed on Jun. 14, 2006, both of which are hereby incorporated by reference in their entirety. The following copending U.S. patent applications are incorporated by reference in their entirety herein: U.S. Patent Application No. 60/804,773, filed Jun. 14, 2006, (492.768, LVM 242085) and titled MICROWAVABLE BAG OR SHEET MATERIAL; U.S. Patent Application No. 60/804,770, filed Jun. 14, 2006, (492.774, LVM 251892) and titled MICROWAVABLE BAG OR SHEET MATERIAL; U.S. Patent Application No. 60/804,778, filed Jun. 14, 2006, (492.766, LVM 251893) and titled MICROWAVABLE BAG OR SHEET MATERIAL; U.S. Patent Application No. 60/804,762, filed Jun. 14, 2006, (492.804, LVM 251895) and titled MICROWAVABLE BAG OR SHEET MATERIAL; U.S. Patent Application No. 60/804,766, filed Jun. 14, 2006, (492.778, LVM 251896) and titled MICROWAVABLE BAG OR SHEET MATERIAL; U.S. Patent Application No. 60/804,768, filed Jun. 14, 2006, (492.776, LVM 251898) and titled MICROWAVABLE BAG OR SHEET MATERIAL.

FIELD OF THE INVENTION

The invention pertains to bags and sheet materials suitable for use in the cooking of food items, and more particularly bags and sheet materials suitable for cooking food items in a microwave oven.

BACKGROUND OF THE INVENTION

Cooking food items in a microwave is often convenient because it takes a much shorter time to cook the food item than in a conventional oven. Microwavable food items, however, often suffer in quality despite their convenience. For example, frequently food items turn out soggy rather than having the crisping and browning characteristics achieved when cooking in a conventional oven. This is particularly true for meats (i.e., chicken, white fish, salmon, pork chops, etc.) cooked in a microwave oven which lack the appearance and taste acquired by cooking on a stove top or in a conventional oven.

A susceptor material may be used to aid the cooking of a food item in a microwave oven. The susceptor material is typically constructed of a material suitable for absorbing, transmitting, or reflecting microwave energy to cook food. Typically the susceptor material includes a metallic layer on a substrate material such as a rigid cardboard or paper. The susceptor/substrate combination is sold with frozen food items and is used to aid in the cooking of the food items in a microwave oven. Although current susceptor materials provide an improvement in cooking food in a microwave without a susceptor material, they still do not provide the browning and crisping of a quality that approaches the quality achieved when a food item is cooked in a conventional oven. Therefore, there is a need for improved bags and sheet materials utilizing a susceptor for cooking food items in a microwave.

BRIEF SUMMARY OF THE INVENTION

The invention provides a microwavable material having a structure that may be used to enhance the browning and crisping, and thus improve the taste and appearance, of a food item cooked therein. The material may be in the form of a sheet material or formed as a container such as a bag, pouch, or other suitable structure. Generally, the closer contact that the susceptor material has with a food item, the better browning and crisping characteristics will occur during cooking. Thus, the material may comprise one or more features that help bring the material into close contact with the food item and help conform the material around the food item. Crisping and browning may also be affected by the presence of too much liquid released by the food item. Therefore, the material may comprise a structure that avoids substantial contact with liquid released by a food item or may have a venting system suitable for the exiting of moisture. Furthermore, the material may comprise a coating, a transparent surface, and when formed as a container, it may have a gusseted surface.

DETAILED DESCRIPTION OF THE INVENTION

Figure 1:
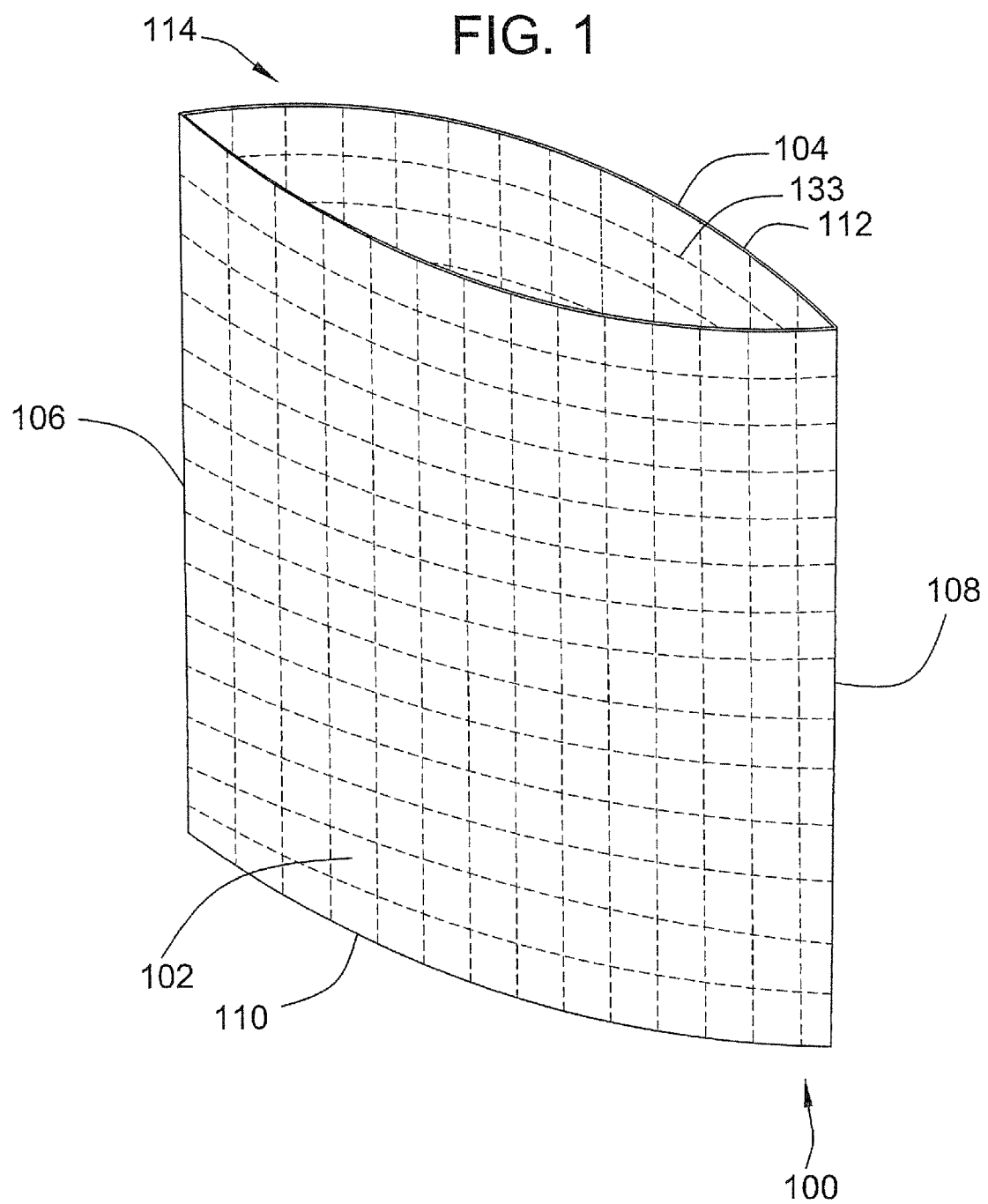
FIG. 1 is a perspective view of a microwavable bag.
Figure 2:
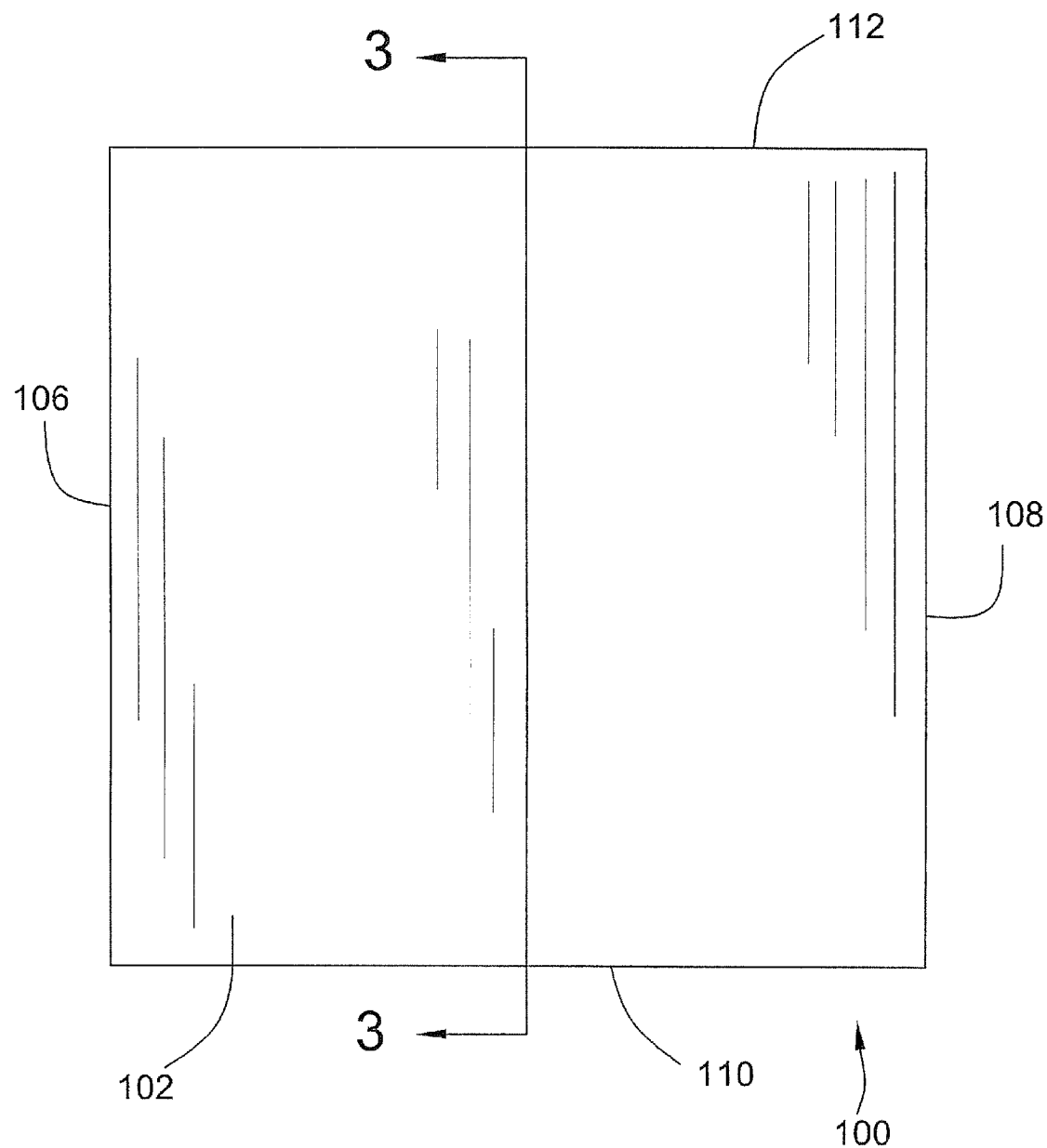
FIG. 2 is an elevational front side view of the microwavable bag of FIG. 1.

Referring to FIGS. 1 and 2, a microwavable bag 100 is shown. The bag 100 generally includes two opposing sidewalls 102, 104 that are attached together along a portion of a periphery of the sidewalls 102, 104, such as along longitudinal edge seams 106, 108 and along a laterally extending bottom edge 110. In the illustrated storage bag 100, the longitudinal edge seams 106, 108 may be formed by sonic welding, heat sealing, an adhesive or other conventional attachment means along the edges of the material forming the sidewalls, and the bottom edge 110 may be defined by a fold in the material forming the sidewalls 102, 104. Further, in another embodiment, the bottom edge 110 may include an edge seam formed in a manner similar to that of the longitudinal edge seams 106, 108. An upper end 112 of the bag 100 includes an open mouth 114 for insertion of articles into the interior of the bag 100. In other embodiments, rather than being closed off, the bottom end may also include an open mouth, and thus, form a sleeve.

Figure 3:
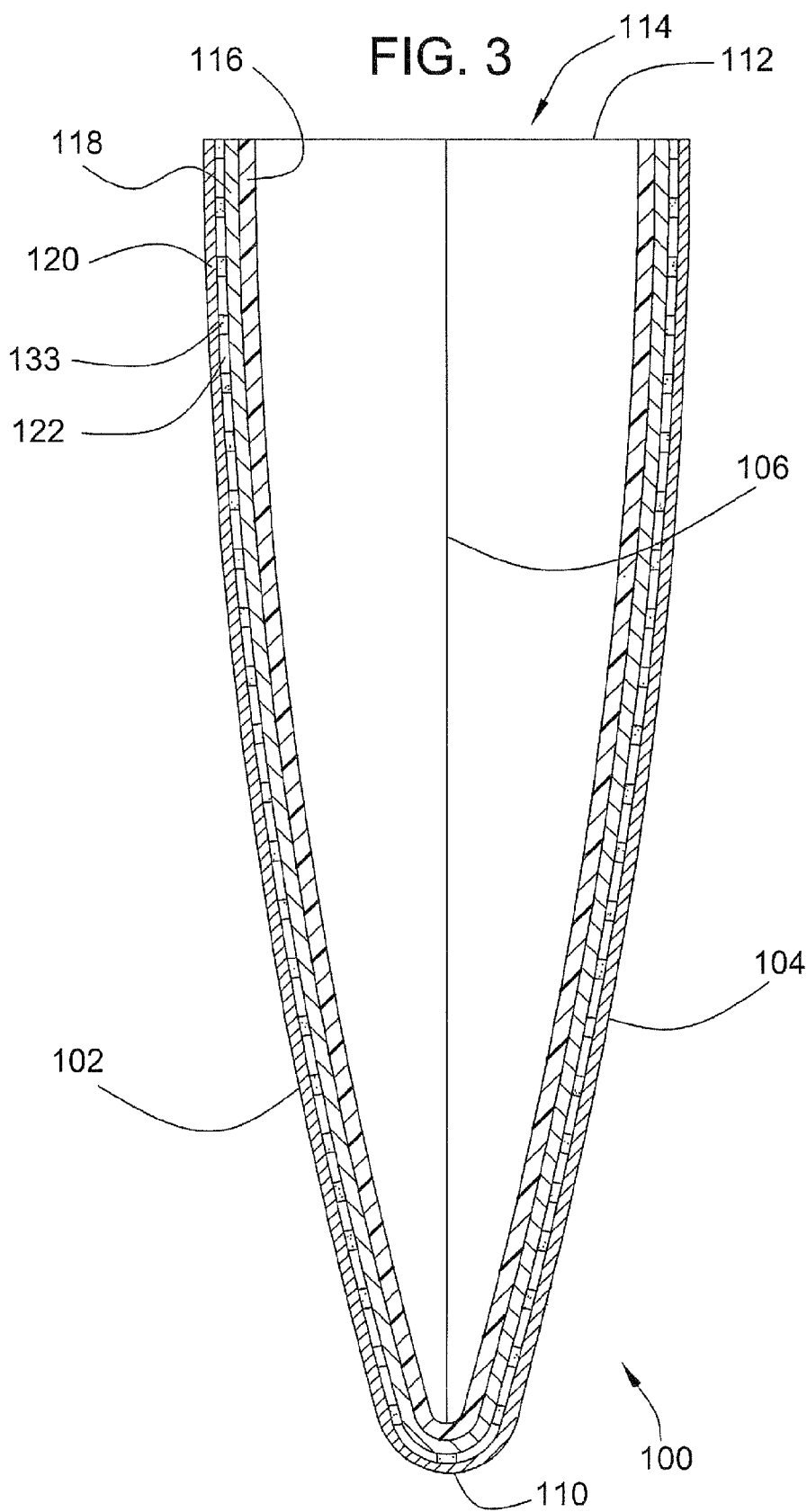
FIG. 3 is a cross-sectional view taken through line 3-3 of FIG. 2.

Referring to FIG. 3, the bag 100 may comprise multiple layers. For example, the bag may have an interior layer 116, a susceptor layer 118, and a substrate layer 120. The interior layer 116 may be disposed on the interior of the bag 100 such that the interior layer 116 is in contact with any food item stored therein. The interior layer 116 may provide a barrier between the susceptor layer 118 and the food item. The interior layer 116 may also resist attachment of the food item to the interior of the bag 100. The interior layer 116 may be constructed of any suitable material including, but not limited to, a plastic. The susceptor layer 118 aids in the cooking, crisping, and browning of a food item by absorbing, transmitting, and/or reflecting microwave energy. The substrate layer 120 may act as a support for the interior and susceptor layers 116, 118. The substrate layer 120 further shields a user's hands from direct contact with the susceptor layer 118, which may be extremely hot during and after the cooking process. The substrate layer 120 may be constructed of any suitable material, including but not limited to, a non-woven or a woven material, paper, a coated vapor impermeable layer, plastic, or foamed plastic. During the cooking process, one or more of the layers may shrink to conform around a food item disposed therein.

In the embodiment shown in FIG. 3, the susceptor layer 118 may be a susceptor material that is deposited (such as by vacuum depositing) onto the interior layer 116 and/or in other embodiments the susceptor layer and the interior layer 116 may be separate layers that are fully laminated to one another. The substrate layer 120 may, however, be selectively adhered to the susceptor layer 118 using an adhesive 133, for example. The selective lamination may form pockets or cells 122 in the bag 100 and may be disposed in a grid pattern (as represented in FIG. 1, for example). These pockets may expand during the cooking process by filling with air/steam. The heated air/steam may be produced by the heating of moisture present in the substrate layer 120. The selective lamination of the susceptor layer 118 to the substrate layer 120 permits the susceptor and interior layers 118, 120 to more easily contract during cooking. Through the expansion of the pockets 122 and the shrinking of the susceptor and/or interior layers 118, 116, the bag 100 may conform closely around a food item to provide a more intimate contact between the susceptor material and the external surface of the food item. These pockets 122 also act as insulators to help reduce undesirable heat loss during the cooking process. Furthermore, the expansion of the pockets 122 may raise the food item away from the base of the microwave oven to more evenly cook the bottom surface of the food item.

It will be appreciated that the substrate layer 120 may be selectively adhered in any suitable manner such that pockets 122 may be formed of any suitable quantity, shape, and/or size. For example, the substrate layer 120 may be selectively adhered to form pockets that are circles, ovals, quadrilaterals, triangles, or other polygon shapes. Having the substrate layer 120 selectively laminated to the susceptor layer 118 may reduce the cost of the bag compared to bags that may include an additional plastic layer on the exterior of the bag that is selectively laminated to the substrate layer.

Figure 4:
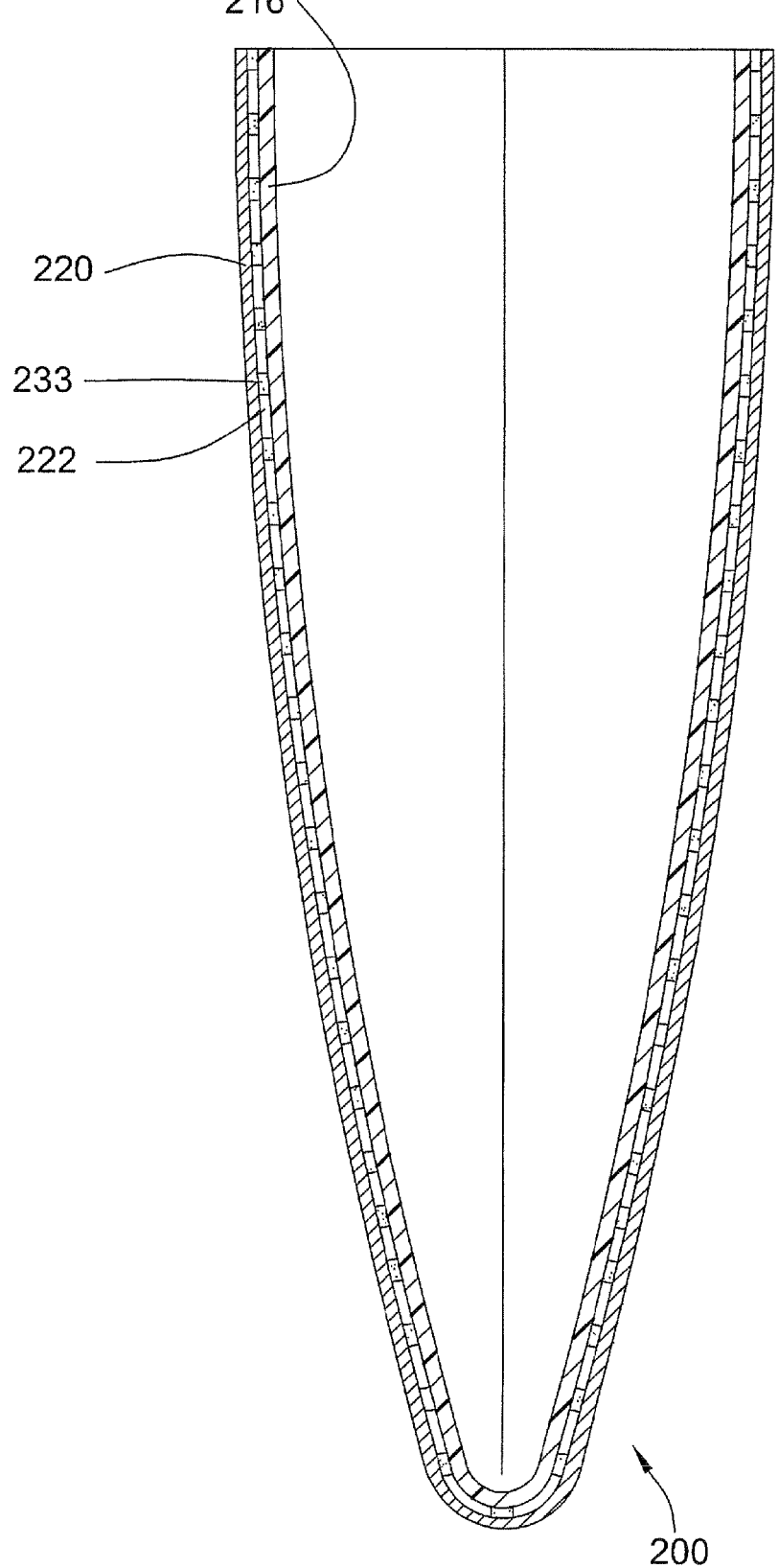
FIG. 4 is a cross-sectional view taken through line 3-3 of FIG. 2 showing another embodiment of a microwavable bag.

Turning to FIG. 4, a two-layer bag 200 is shown. As in the previous embodiment, the bag 200 may have an interior layer 216 and a substrate layer 220. The interior layer 216 may be disposed to form the interior of the bag 200 as explained above. In this embodiment, the interior layer 216 may comprise a susceptor material such that the interior layer 216 also operates as a susceptor layer. The susceptor material may include metal particles or carbon black incorporated into the interior layer 216. As in the previous embodiment, a substrate layer 220 may comprise the exterior of the bag 200. The substrate layer 220 may be selectively adhered to the interior layer 216 to provide pockets 222 suitable for expansion as described above. The substrate layer 220 may be selectively adhered using an adhesive 233 or by another suitable manner.

Figure 5:
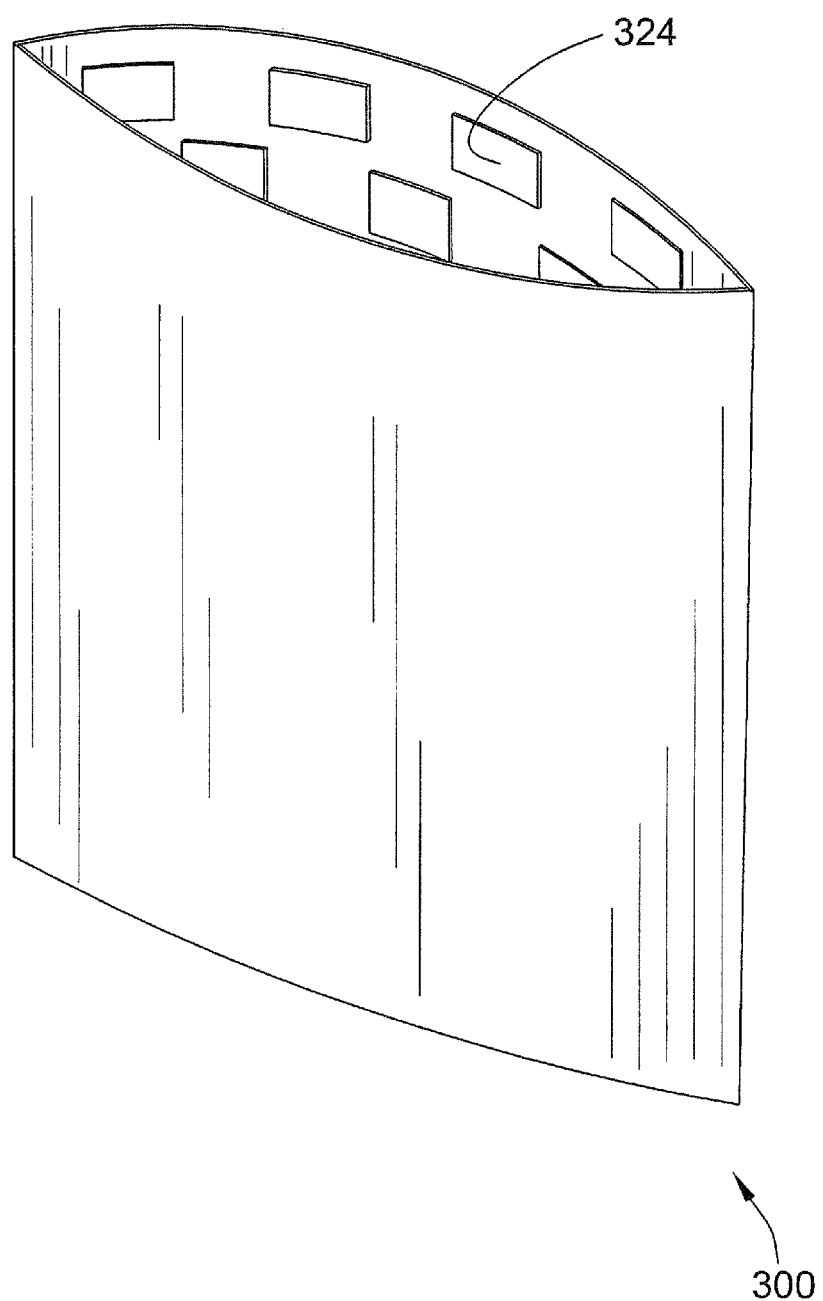
FIG. 5 is a perspective view of another embodiment of a microwavable bag.

In certain applications, it may be desirable to have the susceptor material disposed or concentrated at selective locations of the bag to generate more heat at these locations than other locations within the bag. For example, often certain areas of a food item may tend to cook more quickly than other areas of the food item. Thus, in order to balance this effect, susceptors may be placed at particularized locations to provide a more targeted or controlled heating. As shown in FIG. 5, the susceptor material 324 of the bag 300 may be disposed at selective locations or in certain patterns on the interior of the bag 300. The susceptor material 324 may be provided as patches of susceptor material 324 at desired locations or may be provided as concentrations of susceptor material 324 within the interior layer of the bag.

Figure 6:
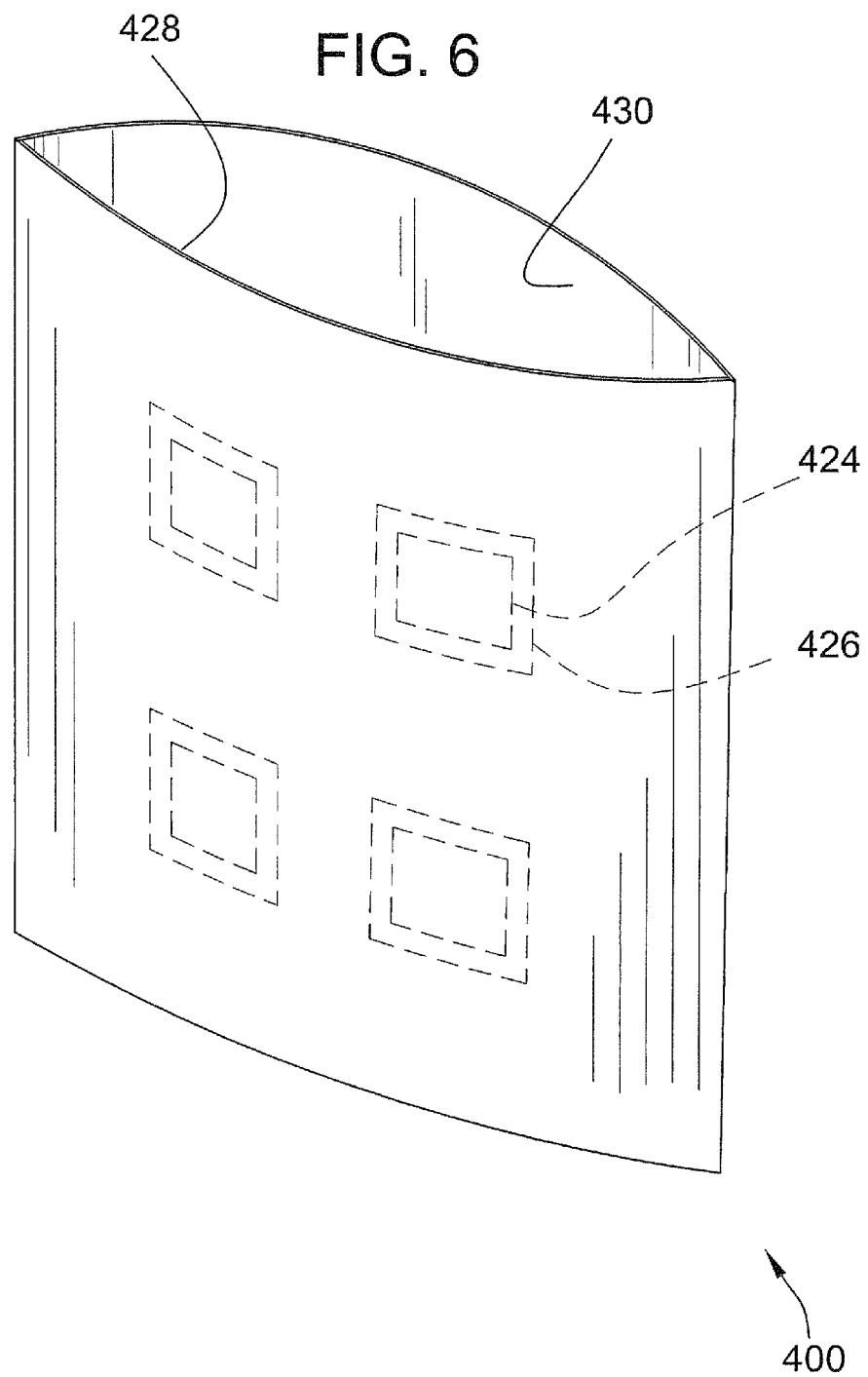
FIG. 6 is a perspective view of another embodiment of a microwavable bag.

Turning to FIG. 6, another embodiment of a bag 400 having selective positioning of a susceptor material 424 is shown. In this embodiment, the bag 400 may have one or more cells 426 disposed on an interior surface 428, 430 of the bag 400. A susceptor material 424 may be disposed within these cells 426 such that selective localized areas of the bag 400 may be heated to a higher temperature than others. The susceptor material 424 may be any suitable susceptor material 424, however, this embodiment is particularly beneficial for loose particles of susceptor material 424. Examples of suitable susceptor materials include, but are not limited to, materials such as sodium bicarbonate, carbon black, and Aluminum susceptor. The cells 426 may be any suitable size and contain any suitable amount of susceptor material 424. It will be appreciated that any suitable number of cells 426 may be provided at any suitable location of the bag 400. Further, the cells 426 may be secured to the bag 400 via any suitable method, such as heat sealing or through the use of an adhesive.

Figure 7:
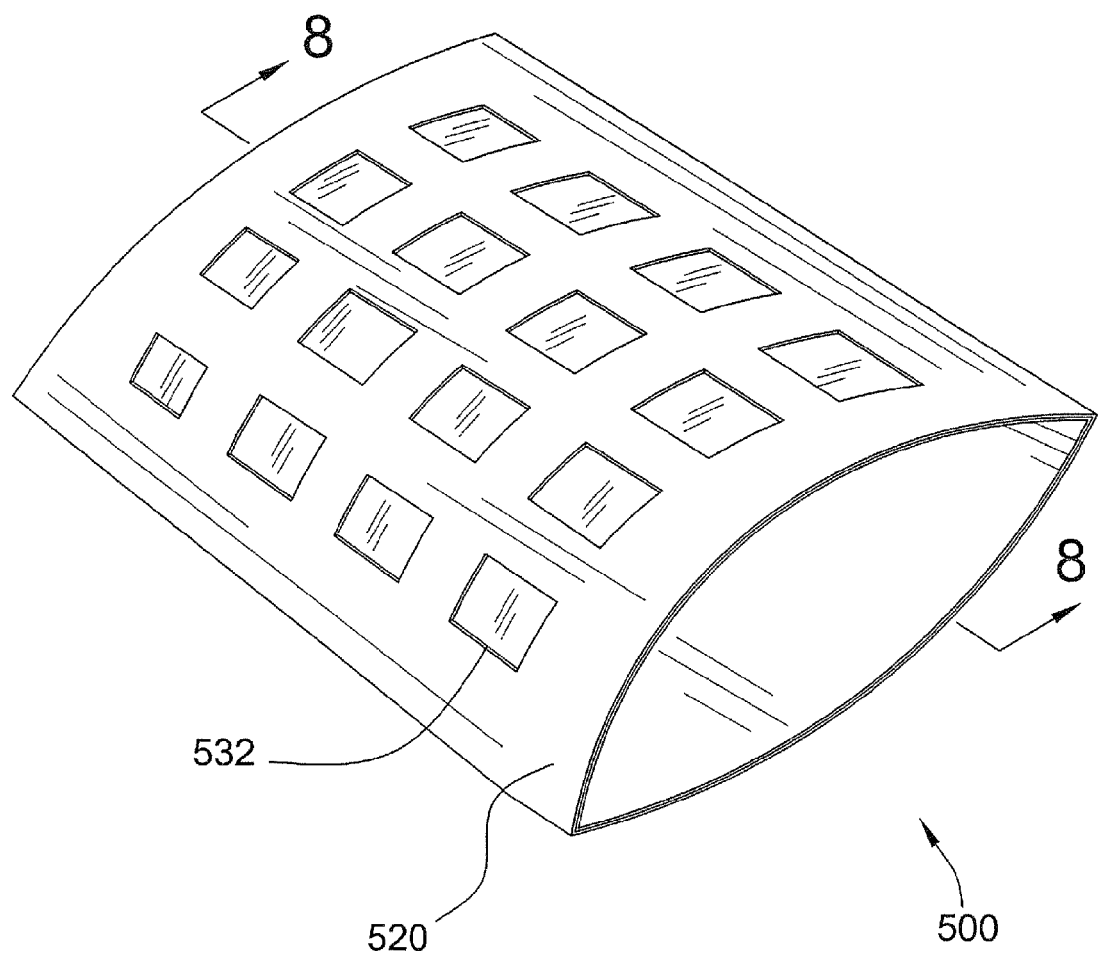
FIG. 7 is a perspective view of another embodiment of a microwavable bag.
Figure 8:
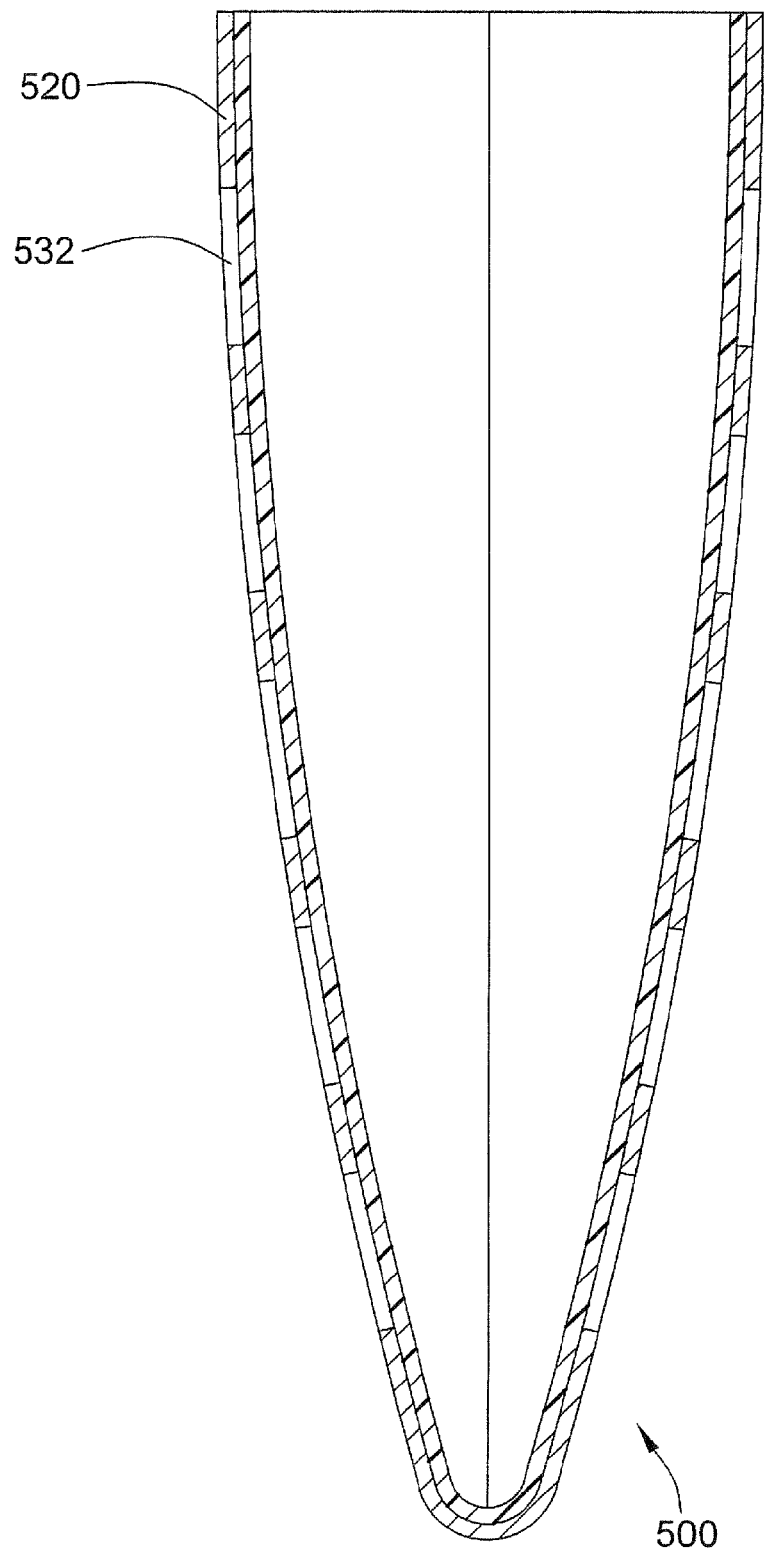
FIG. 8 is a cross-sectional view taken through line 8-8 of FIG. 7.
Figure 9:
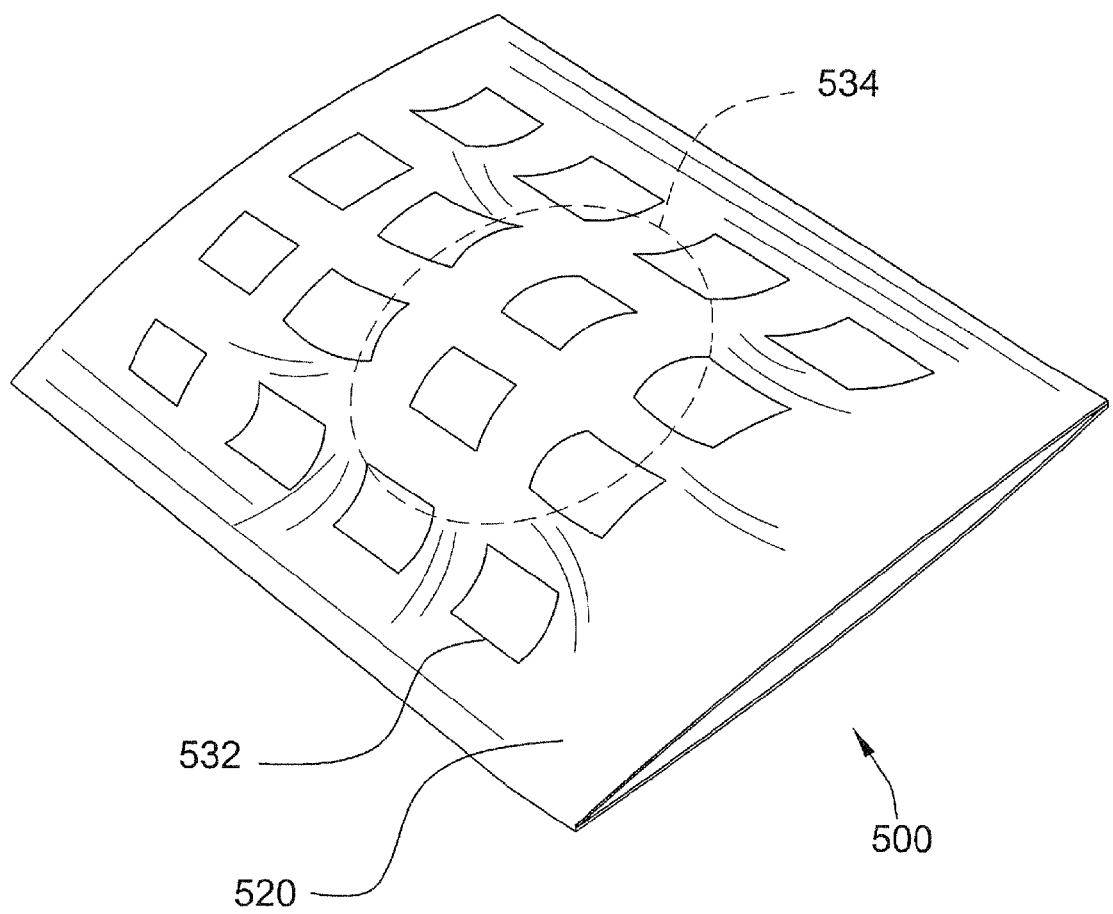
FIG. 9 is a perspective view of the microwavable bag of FIG. 7 after microwaving with a food item disposed therein.
Figure 10:
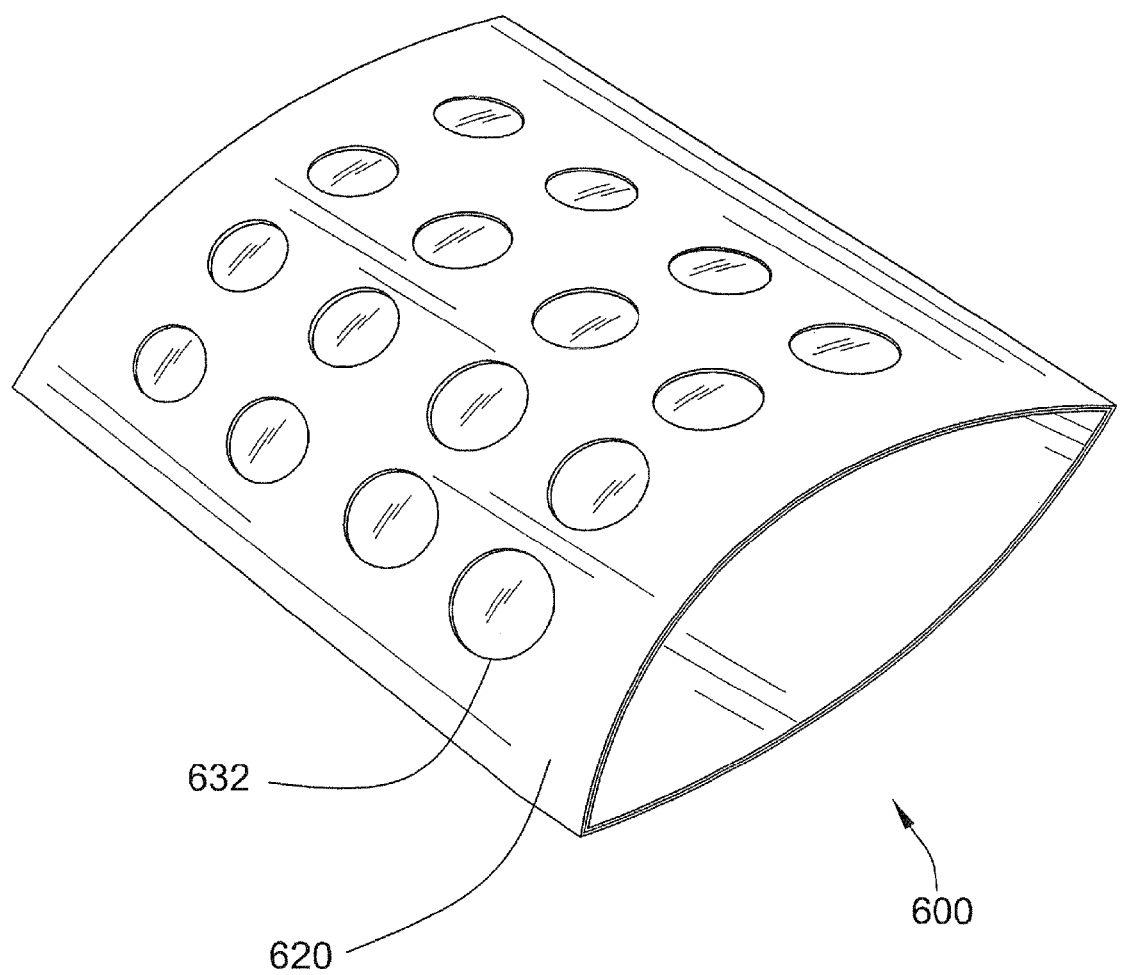
FIG. 10 is a perspective view of another embodiment of a microwavable bag.

Generally, by having multiple layers, the bag may, in certain embodiments, have difficulty achieving sufficient conformance around a food item to provide a desired browning or crisping. For example, the substrate layer of the bag may add stiffness to the bag that may at least partially resist any tendency of the bag to shrink and conform around a food item. As shown in FIGS. 7 and 8, to weaken the substrate layer 520 and promote the conformance of the bag 500 around the food item, the substrate layer 520 may comprise one or more apertures 532. As depicted in FIG. 9, the apertures 532 in the substrate layer 520 help the bag 500 to conform closely around the food item. The apertures 532 may be any suitable quantity, shape, and/or size. For example, as shown in FIG. 7, the apertures 532 may be quadrilaterally shaped. In another embodiment, as shown in FIG. 10, the bag 600 may have circular apertures 632 in the substrate layer 620. In other embodiments, the apertures may be triangles, ovals, or other polygons.

Figure 11:
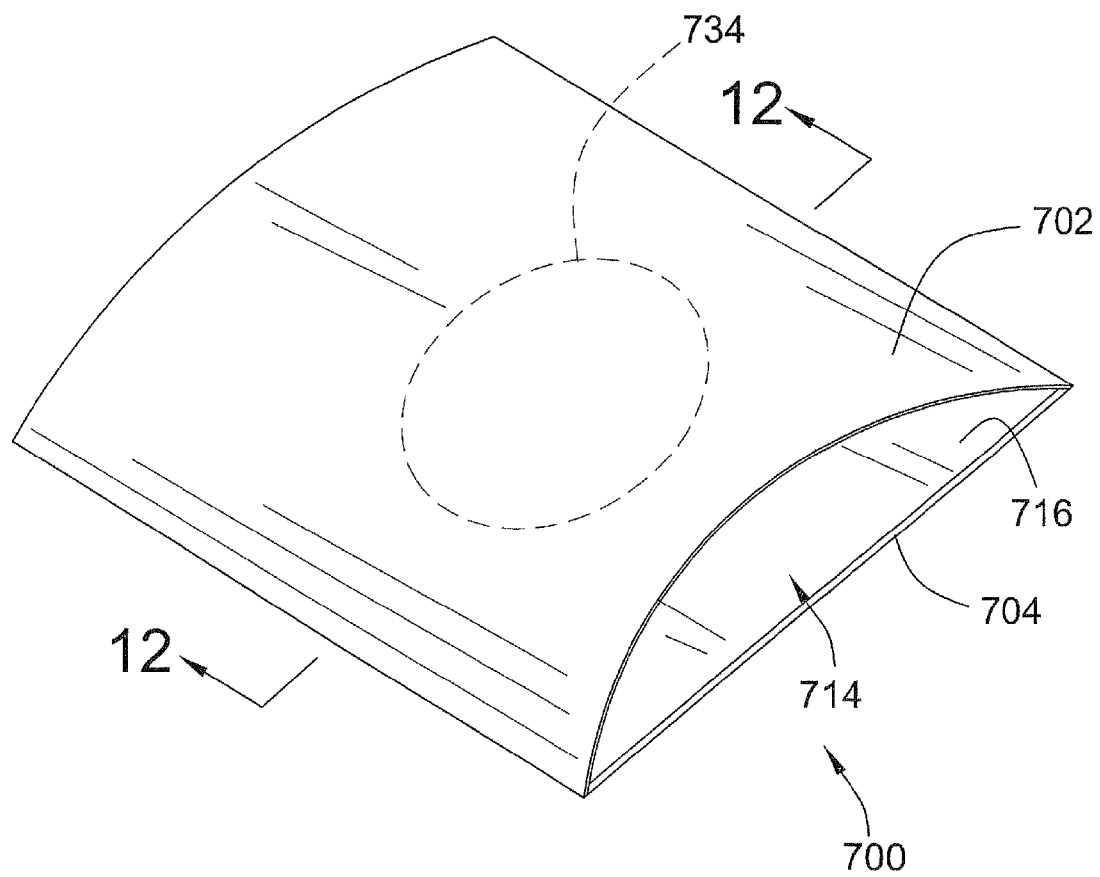
FIG. 11 is a perspective view of another embodiment of a microwavable bag with a food item disposed therein.
Figure 12:
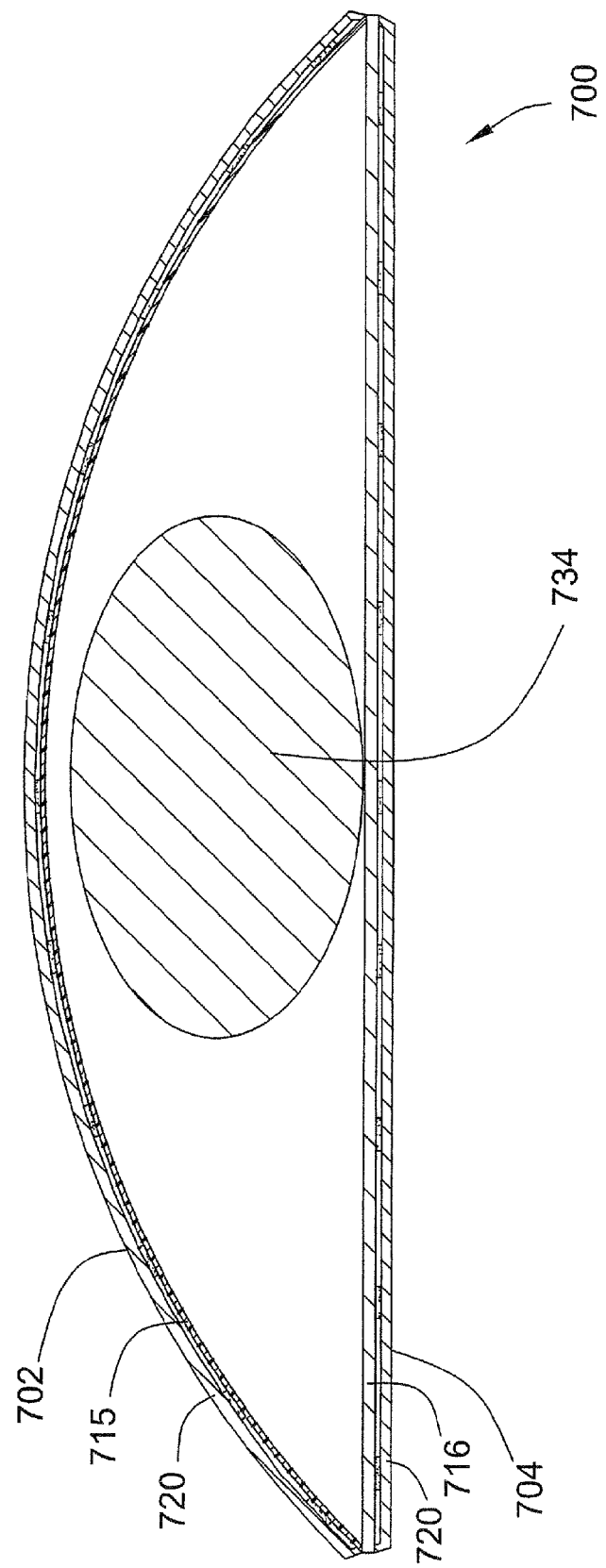
FIG. 12 is a cross-sectional view of a microwavable bag taken through line 12-12 of FIG. 11.
Figure 13:
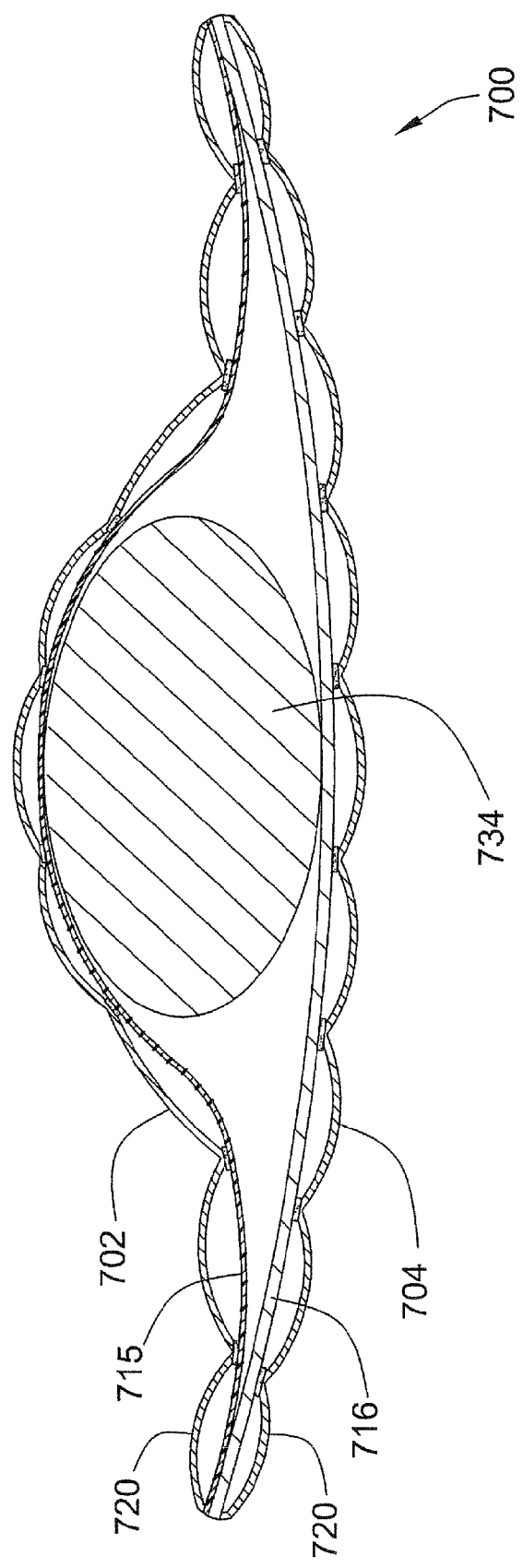
FIG. 13 is a cross-sectional view taken through line 12-12 of FIG. 11 showing the microwavable bag after microwaving.
Figure 14:
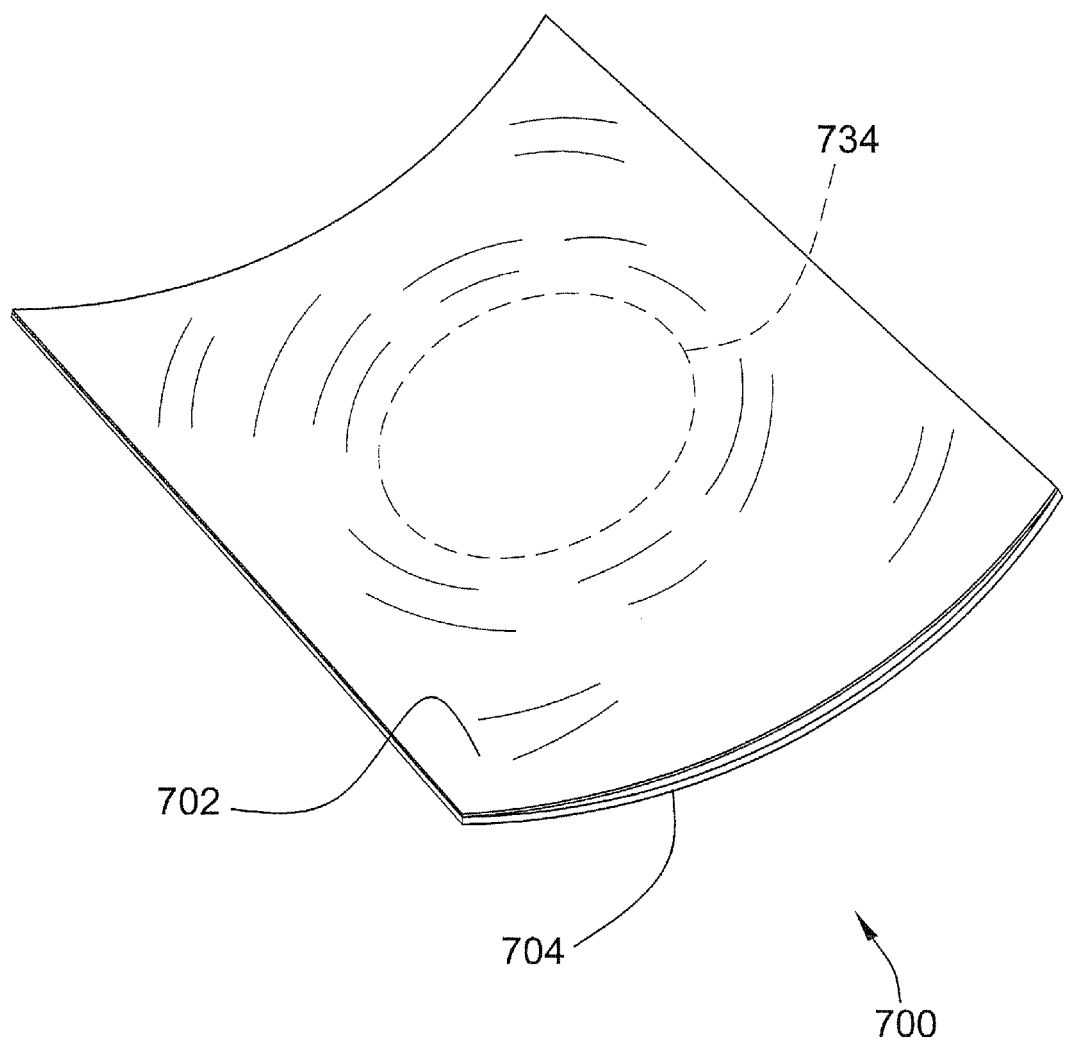
FIG. 14 is a perspective view of the microwavable bag of FIG. 11 after microwaving.

Turning to FIGS. 11 and 12, the bag 700 may comprise one or more layers on one sidewall having a thickness greater (and thus, a higher thermal mass) than one or more of the layers on the opposing sidewall of the bag 700. For example, the interior layer 716 on one sidewall 704 may have a larger thickness than the interior layer 715 on the opposing sidewall 702. The food item may be placed in a microwave oven with the thicker sidewall 704 being disposed below the food item 734. During microwaving, as shown in FIGS. 13 and 14, the sidewall 702 having a smaller thickness will shrink at a different rate than the sidewall 704 having a larger thickness. Since the sidewall 702 having the smaller thickness is disposed above the food item 734, it will pull the edges of the bag 700 upward causing the bag 700 to curl and, in effect, creating a bowl shape. The curling aids in the conformance and more intimate contact of the interior layer 716 and susceptor material with the food item 734. The bowl shape also helps restrict any juices or other liquids released by the food item 734 from exiting through the open mouth 714 and soiling the microwave oven. Rather than exiting the bag 700, any liquids will accumulate near the center of the bowl shape. In addition, the thicker sidewall will absorb more microwave energy and thus, provide more heat to the food item. It will be appreciated that any suitable layers of the bag may have a larger thickness than layers on an opposing sidewall.

Curling of the bag, as described above, may be accomplished through other properties of the bag sidewalls. In some embodiments, the plastic film used for the bags is biaxially oriented. Thus, the bag has been stretched in multiple directions to provide the film with certain desirable characteristics, such as improved strength. In other embodiments, the film may be oriented along a single direction. Further, the bag may utilize a film oriented in one manner for one sidewall of the bag and a film oriented in another manner for the other sidewall of the bag.

Figure 15:
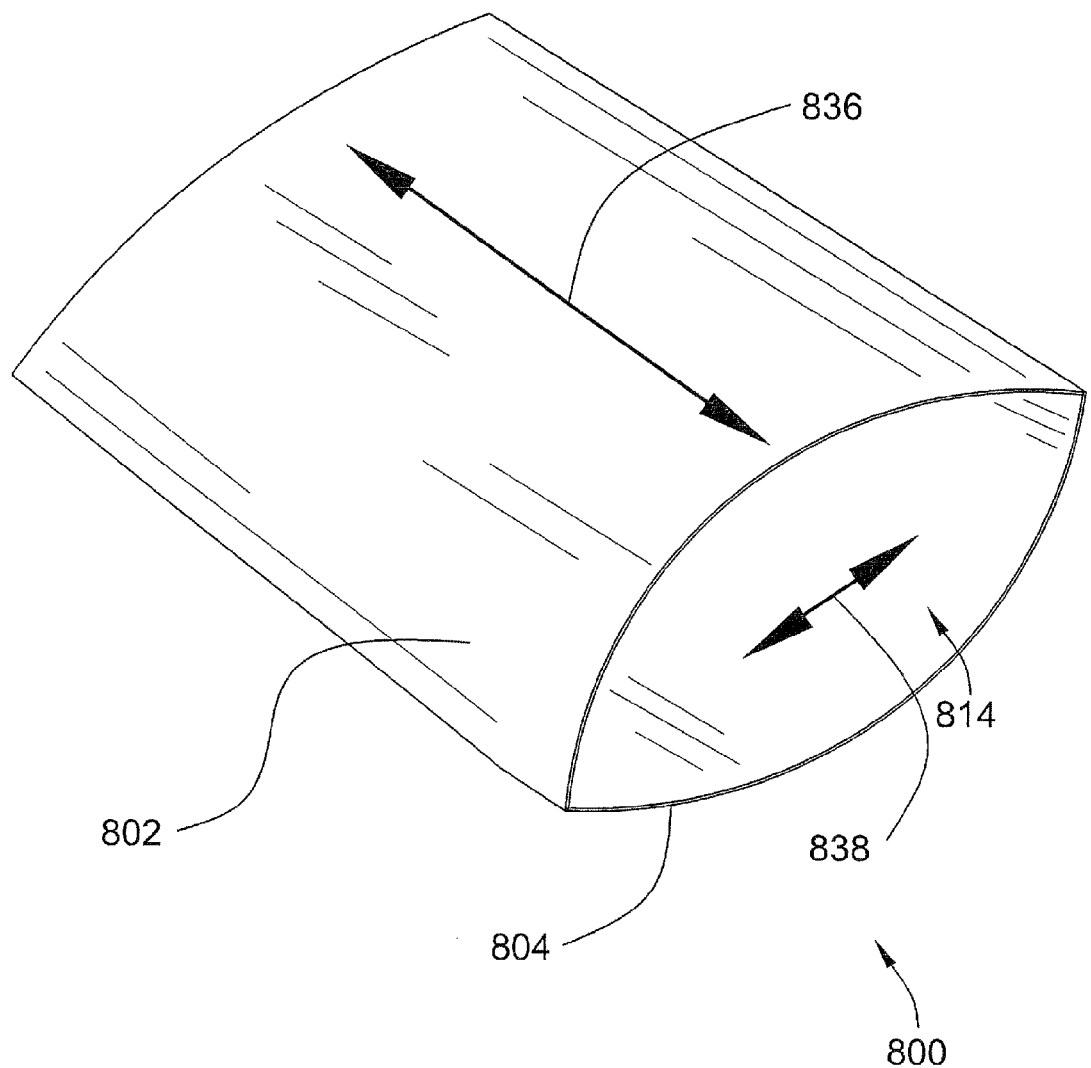
FIG. 15 is a perspective view of another embodiment of a microwavable bag.
Figure 16:
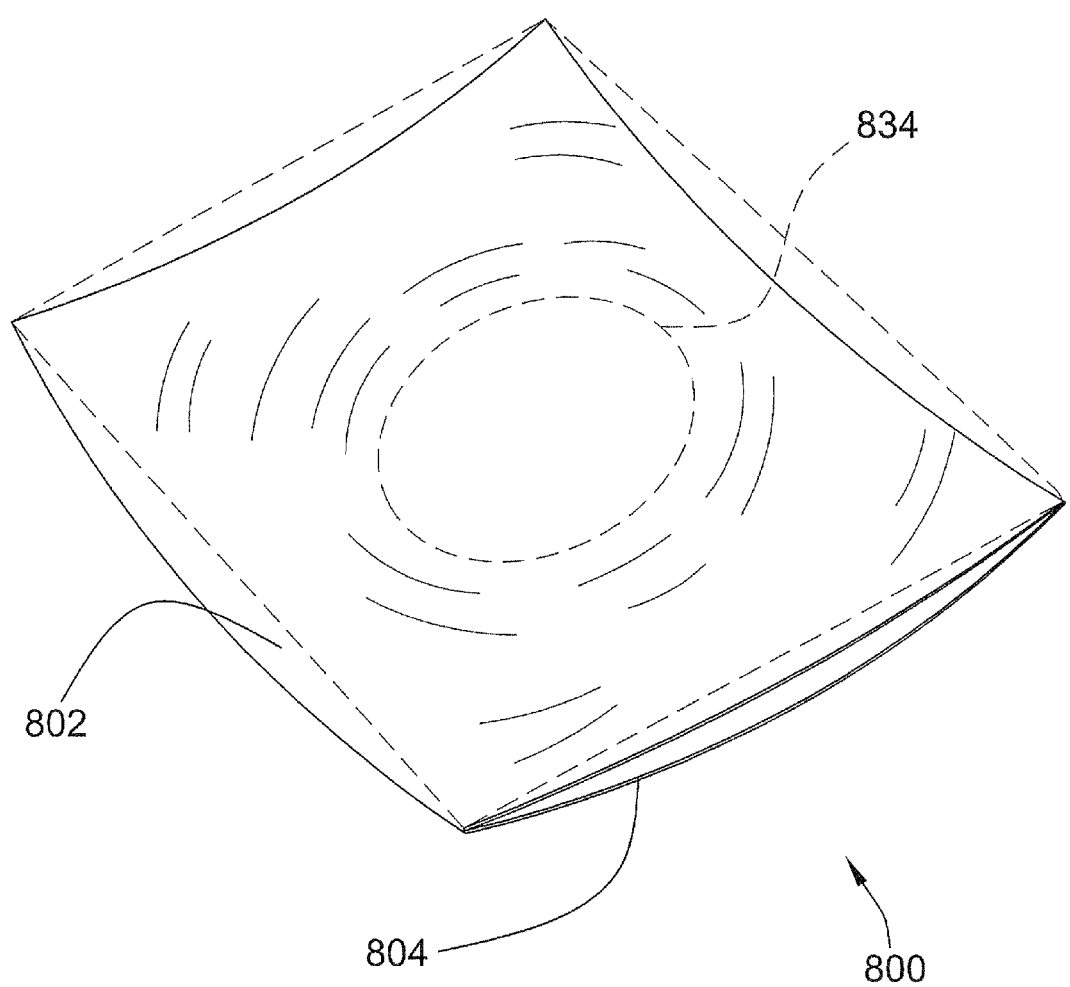
FIG. 16 is a perspective view of the microwavable bag of FIG. 15 after microwaving and shown with a food item disposed therein.
Figure 17:
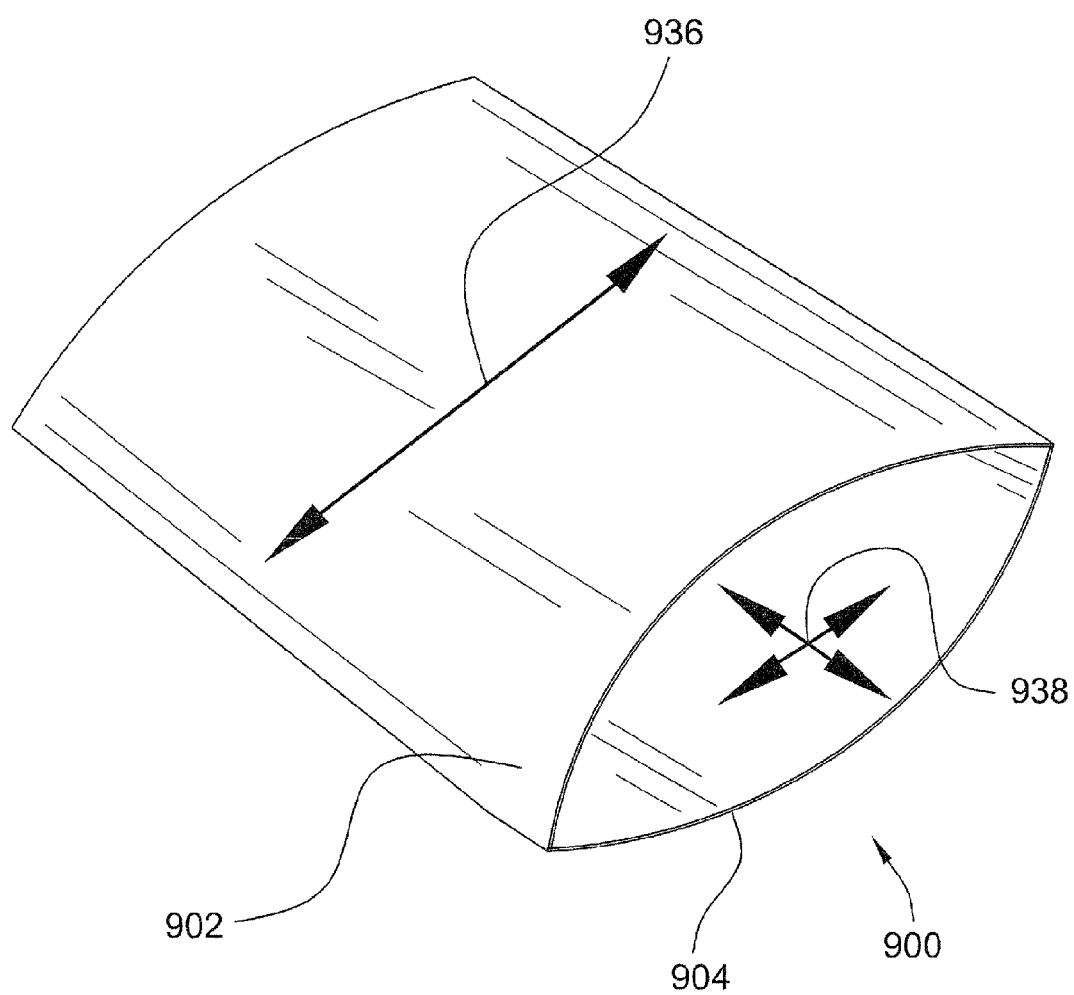
FIG. 17 is a perspective view of another embodiment of a microwavable bag.

For example, turning to FIG. 15, the bag 800 may utilize a film oriented perpendicular to the mouth 814 of the bag 800 (i.e., a machine direction as indicated by arrow 836) for one sidewall 802 of the bag 800 and a film oriented parallel with the mouth 814 of the bag 800 (i.e., a transverse direction as indicated by arrow 838) for the other sidewall 804. When the bag 800 is used in a microwave oven, each sidewall 802, 804 of the bag 800 has a tendency to shrink more readily along one axis (perpendicular to the axis of orientation or stretching) than along another axis (parallel with the axis of orientation or stretching). This results in each sidewall 802, 804 curling to form a U-shape (were it not attached to another sidewall having an alternate orientation). When a bag 800 having sidewalls 802, 804, as shown in FIG. 15, that are oriented along respective axes disposed perpendicular to one another, the bag 800 will tend to curl in both directions and conform around a food item 834 to form a bowl shape as shown in FIG. 16.

Figure 18:
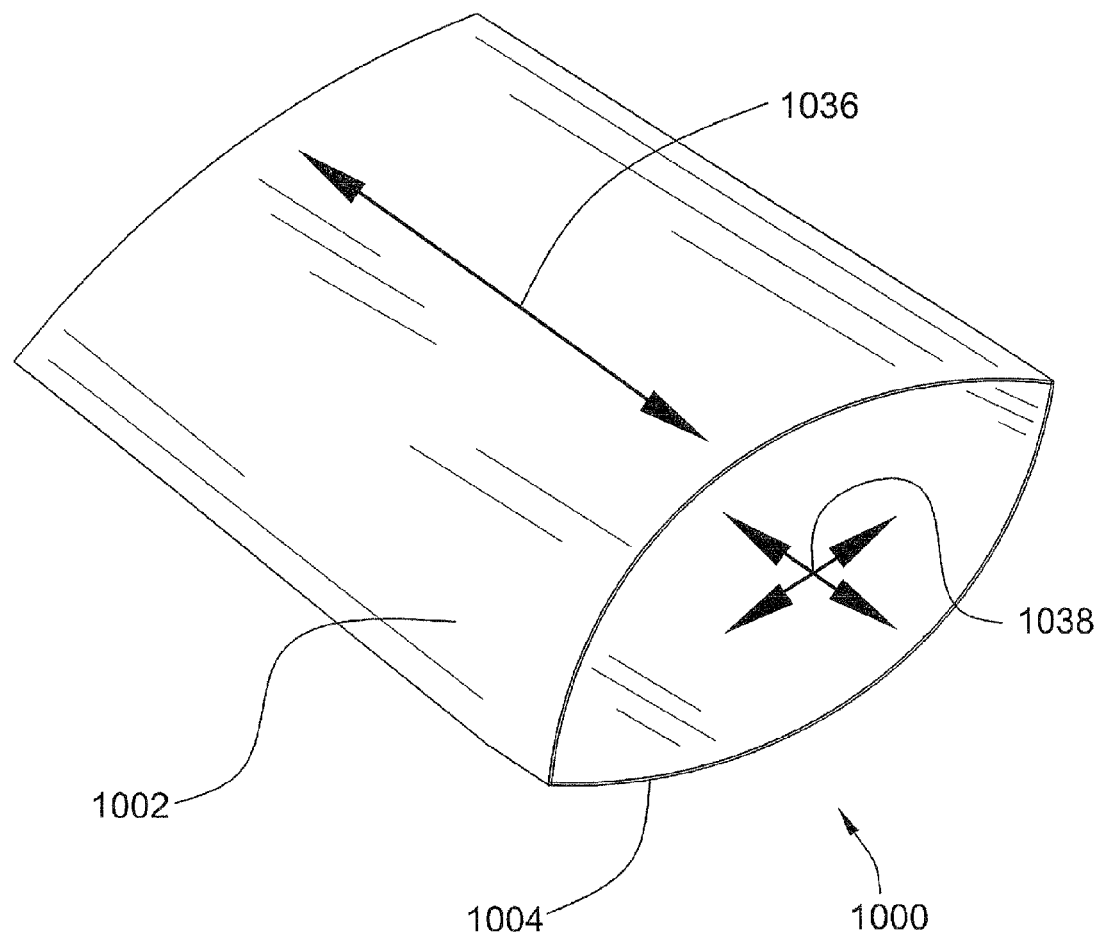
FIG. 18 is a perspective view of another embodiment of a microwavable bag.
Figure 19:
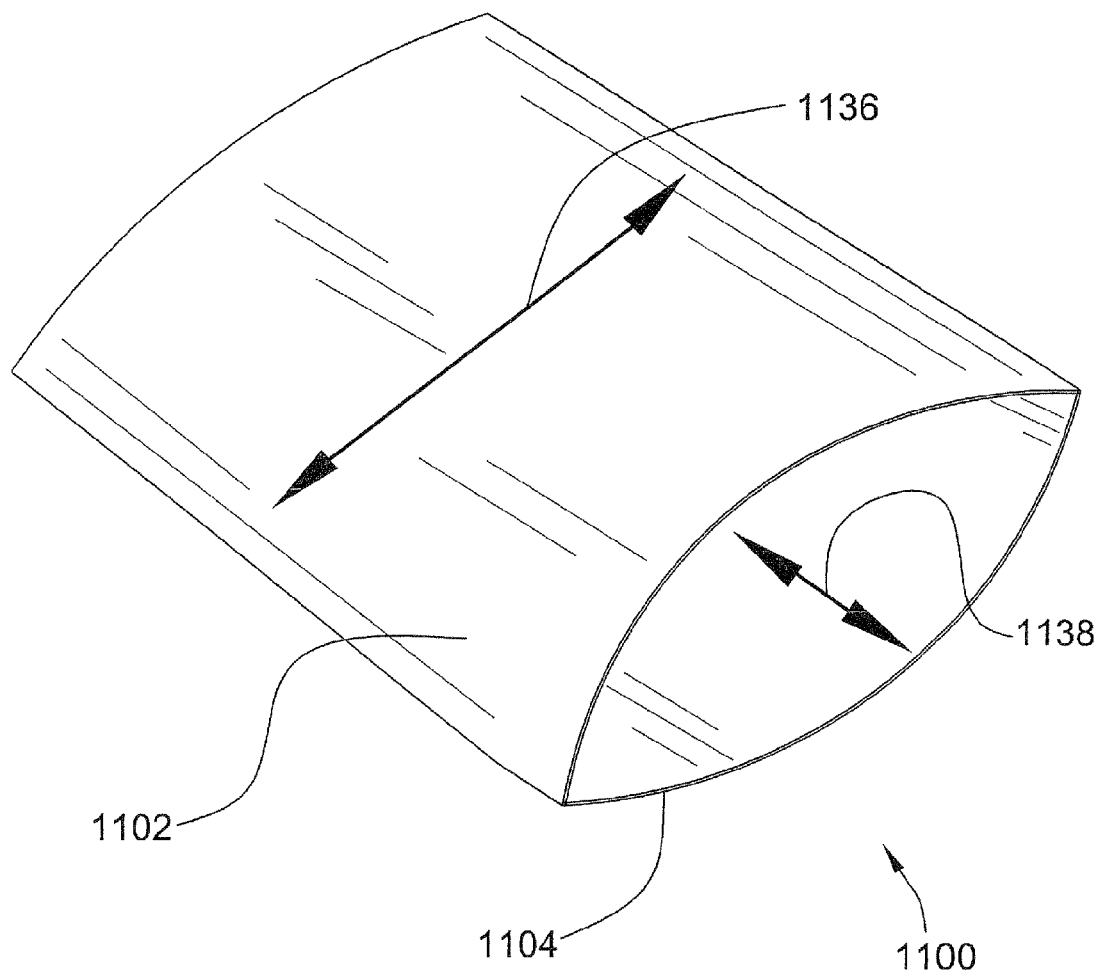
FIG. 19 is a perspective view of another embodiment of a microwavable bag.
Figure 20:
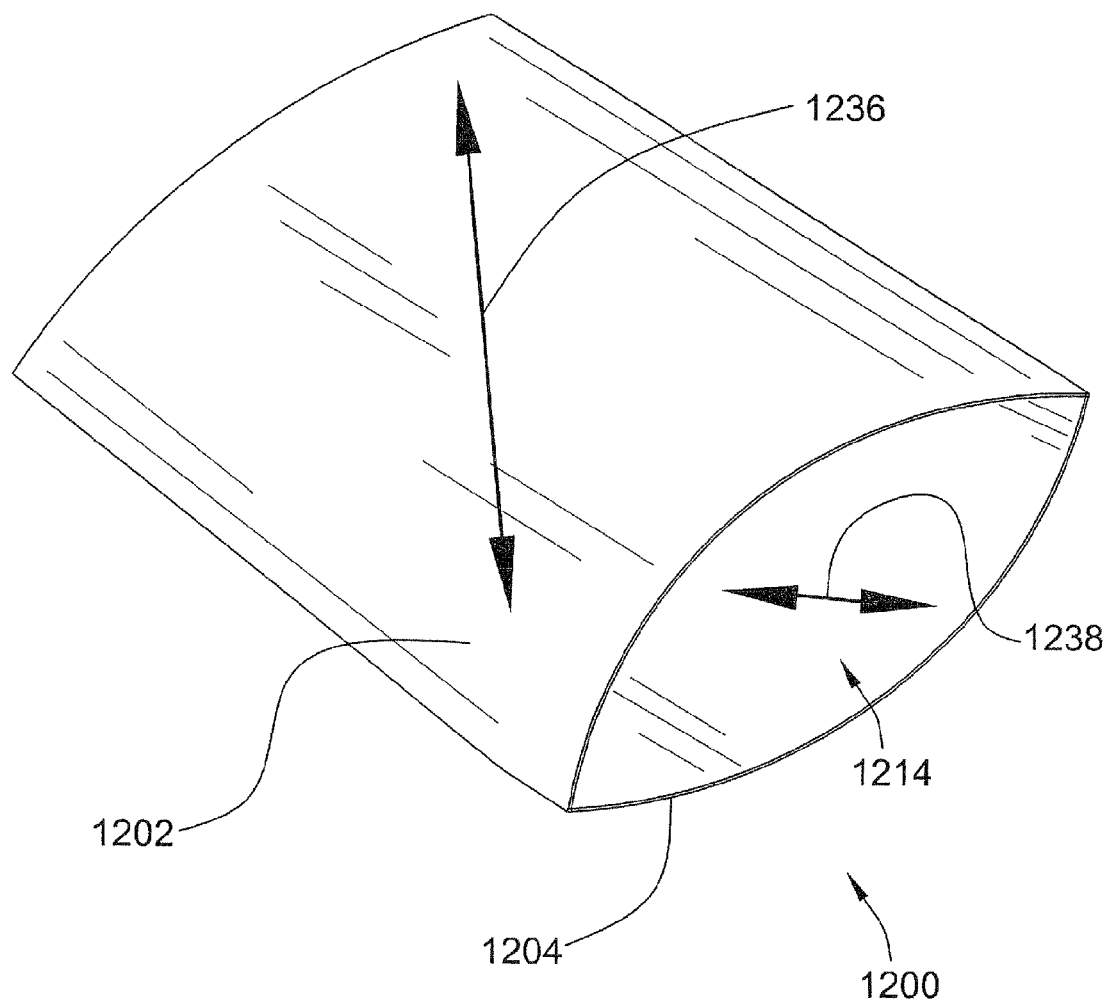
FIG. 20 is a perspective view of another embodiment of a microwavable bag.

It will be appreciated that the opposing sidewalls of the bag may be oriented along any suitable directions to create a curling or bowl shape effect when heated in a microwave oven. By way of example and not limitation, as shown in FIGS. 17-20 the sidewalls may be oriented in various directions. For example, in FIG. 17 the top sidewall 902 of the bag 900 may be oriented in a transverse direction 936 and the bottom sidewall may be biaxially oriented 938. In FIG. 18, the top sidewall 1002 of the bag 1000 may be oriented in a machine direction 1036 and the bottom sidewall 1004 may be biaxially oriented 1038. In FIG. 19, the top sidewall 1102 of the bag 1100 may be oriented in a transverse direction 1136 and the bottom sidewall 1104 may be oriented in a machine direction 1138. In FIG. 20, the top sidewall 1202 of the bag 1200 may be oriented at an alternate angle 1236 (such as at approximately 45°) with respect to the mouth 1214 and the bottom sidewall 1204 may be oriented at another angle 1238 (such as at approximately 135°) with respect to the mouth 1214.

Figure 21:
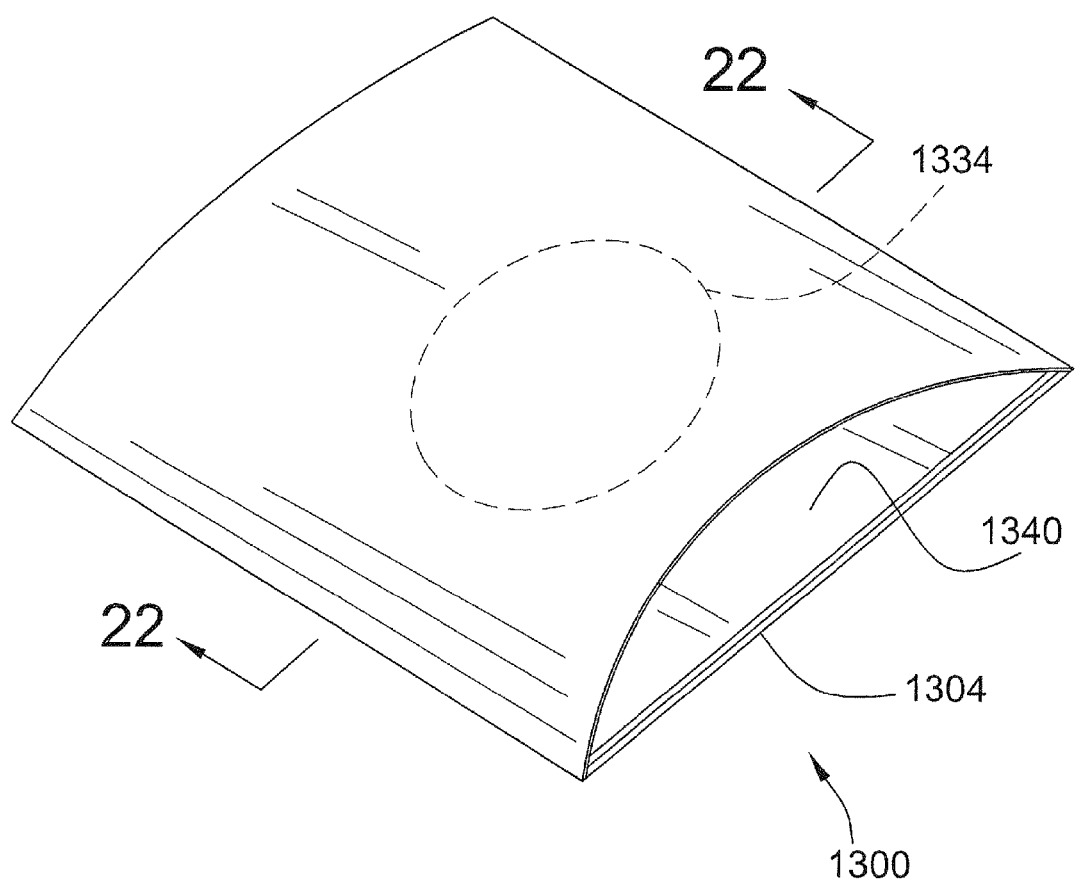
FIG. 21 is a perspective view of another embodiment of a microwavable bag.
Figure 22:
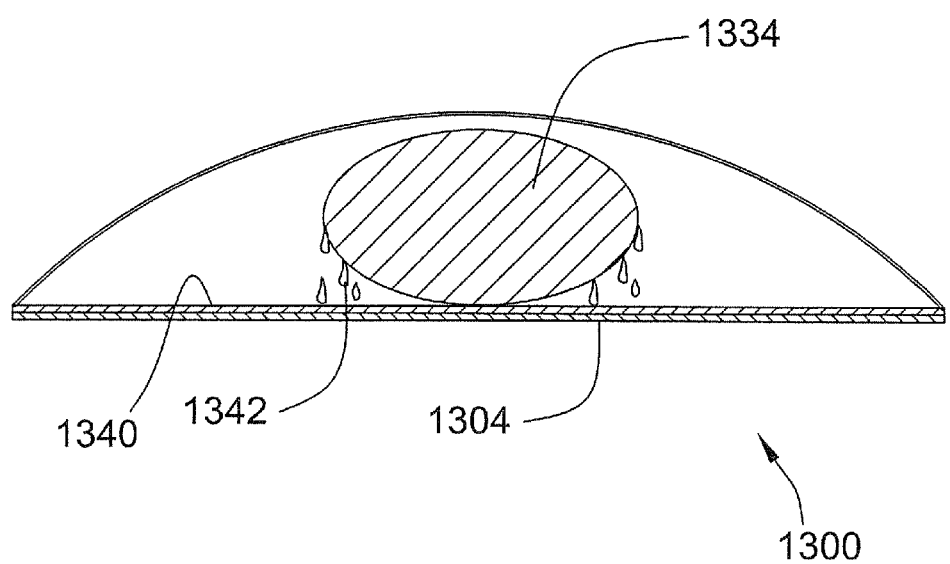
FIG. 22 is a cross-sectional view of a microwavable bag taken through line 22-22 of FIG. 21.
Figure 23:
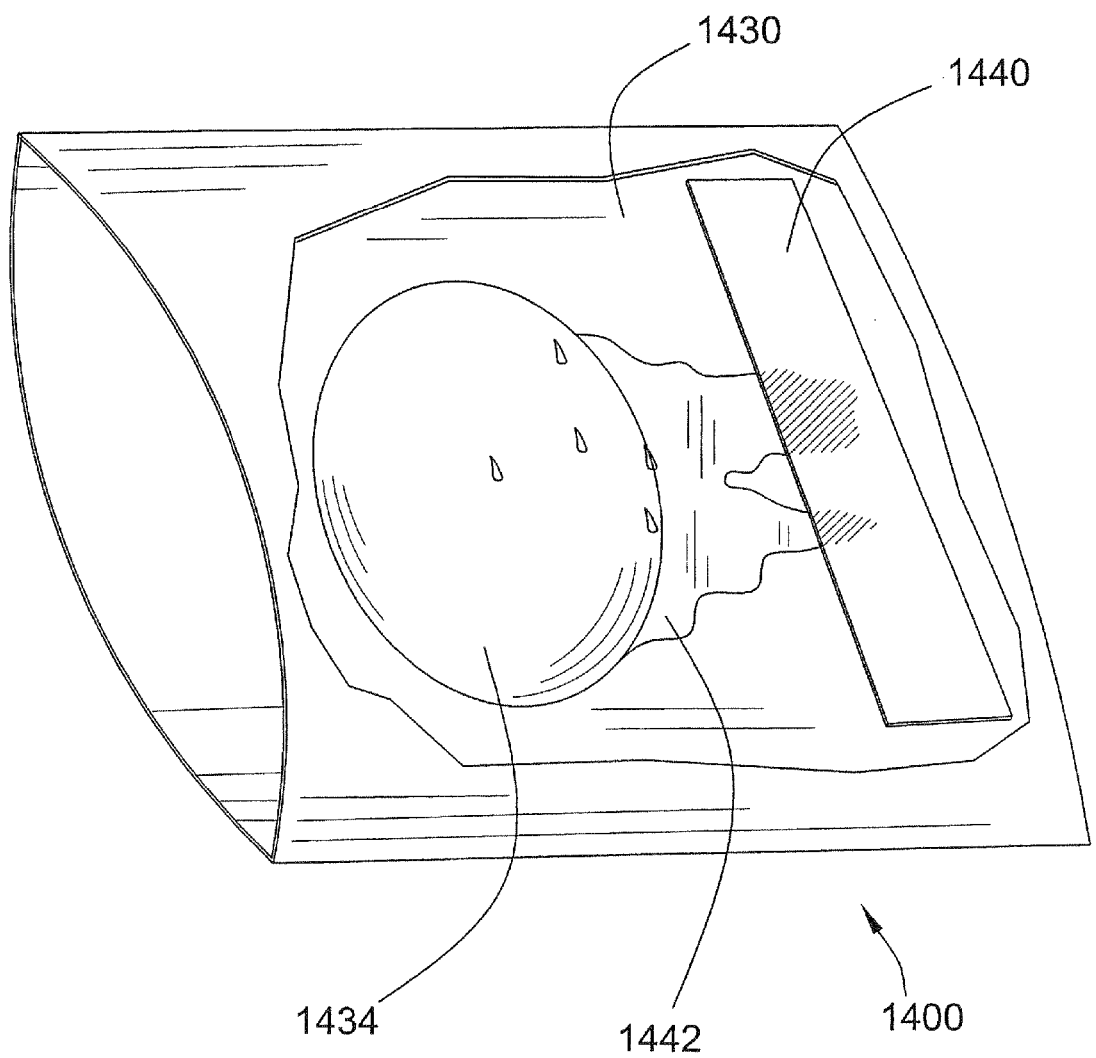
FIG. 23 is a perspective view of another embodiment of a microwavable bag.
Figure 24:
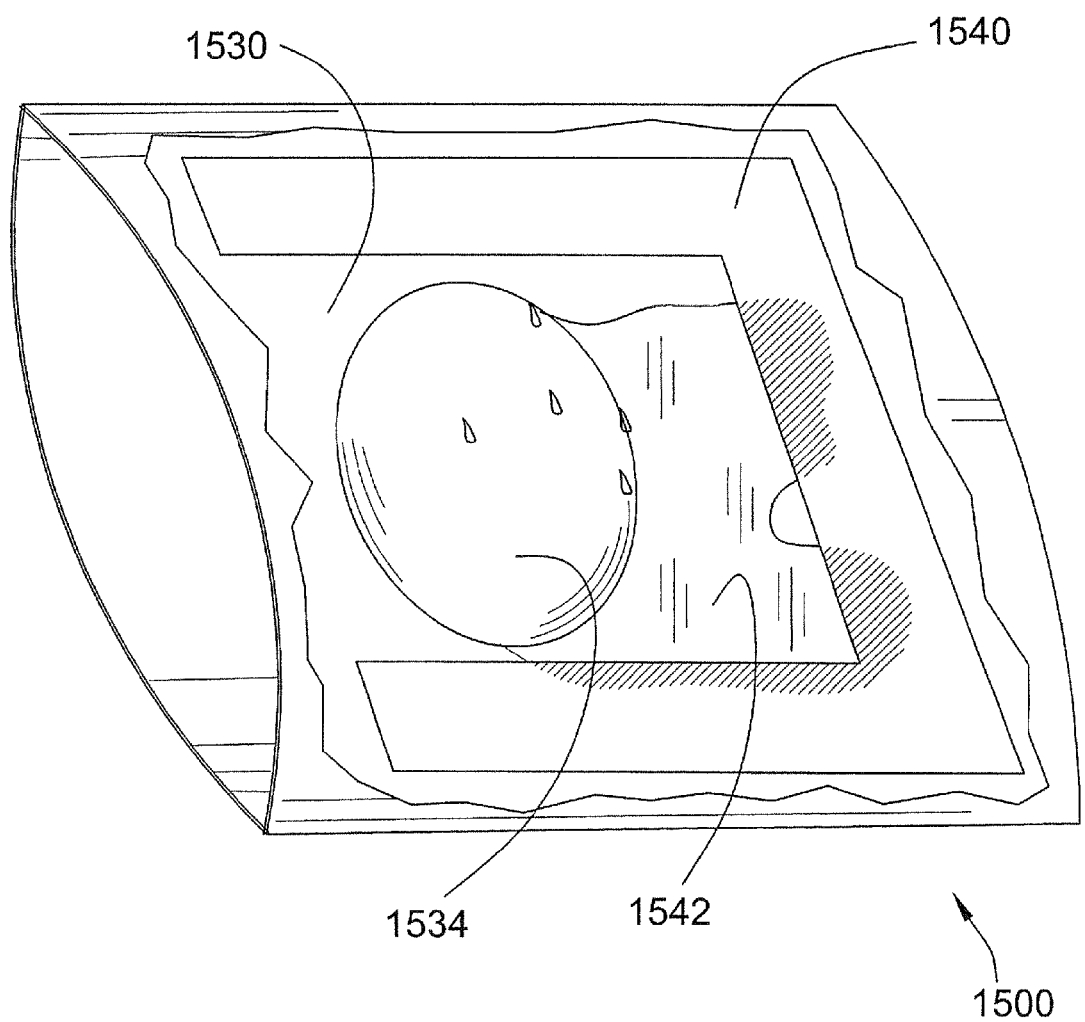
FIG. 24 is a perspective view of another embodiment of a microwavable bag.

When food items are cooked in a microwave oven, they may release moisture which may cause the food item to be soggy and/or leave an undesirable taste. Excessive moisture may also adversely affect the cooking of the food item inasmuch as any liquid may absorb energy away from the food item. To avoid this problem, the bag may comprise an absorbent material disposed such that it is at least partially exposed to the interior of the bag to absorb moisture during the cooking process. As shown in FIGS. 21 and 22, the absorbent material may be a layer 1340 disposed over the entire inner surface of at least one sidewall (such as 1304) of the bag 1300. Thus, as moisture 1342 is released by the food item 1334, it is absorbed by the absorbent material layer 1340. In another embodiment, the absorbent material may be only partially disposed over an inner surface of the bag. For example, as shown in FIG. 23, the bag 1400 may have a strip 1440 of absorbent material disposed on the inner surface 1430 of the bag 1400 to receive moisture 1442 from a food item 1434. As shown in FIG. 24, the bag 1500 may have an absorbent material 1540 disposed on an inner surface 1530 of the bag 1500 to receive moisture 1542 around multiple sides of the food item 1534. A capillary effect may occur such that as moisture comes into contact with the absorbent material, the moisture is pulled away from the food item. The absorbent material may be any suitable material for wicking or distributing moisture away from a food item. For example, the absorbent material may be an absorbent paper. Furthermore, any suitable amount of absorbent material may be used and the absorbent material may have any suitable shape and/or size.

Figure 25:
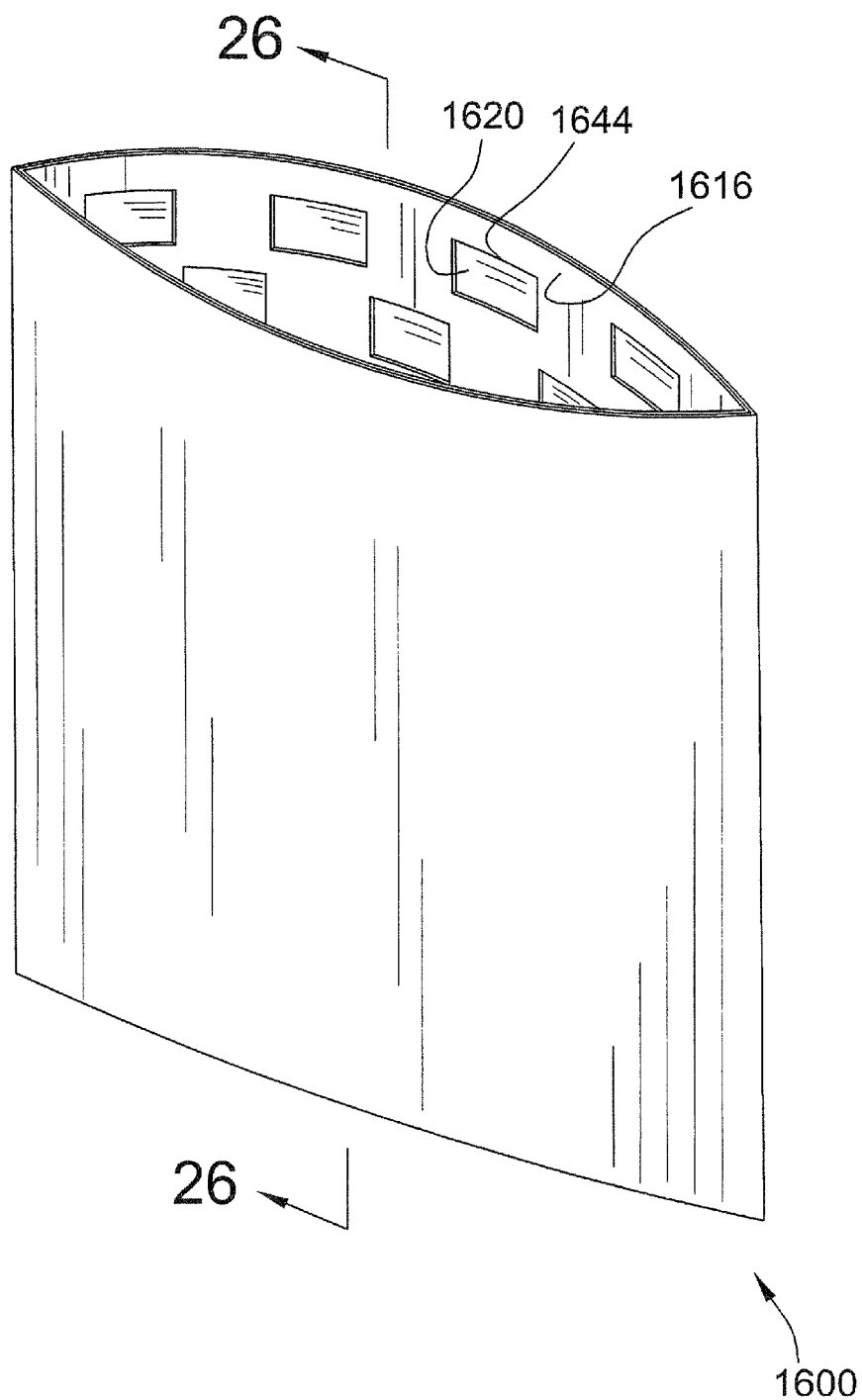
FIG. 25 is a perspective view of another embodiment of a microwavable bag.
Figure 26:
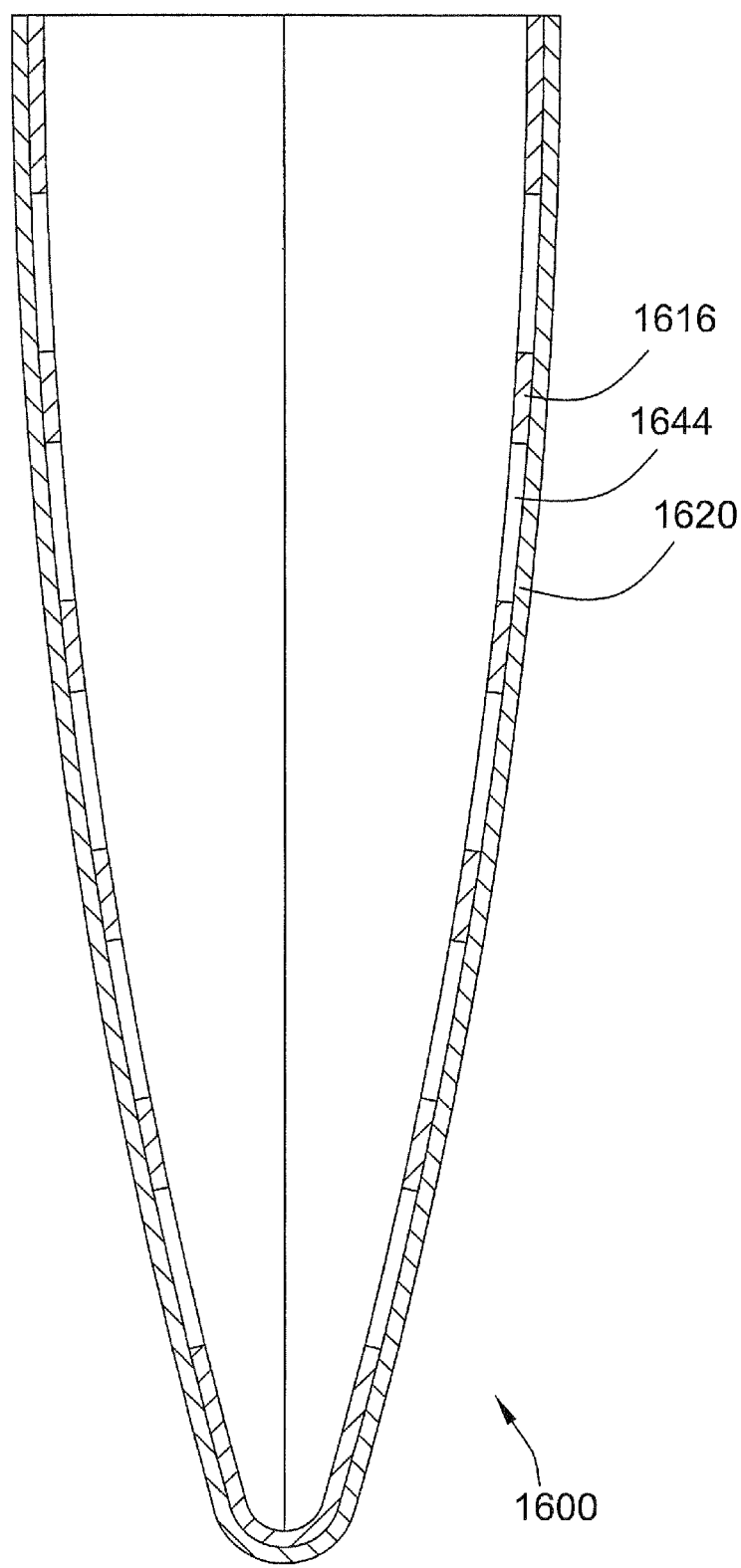
FIG. 26 is a cross-sectional view of a microwavable bag taken through line 26-26 of FIG. 25.
Figure 27:
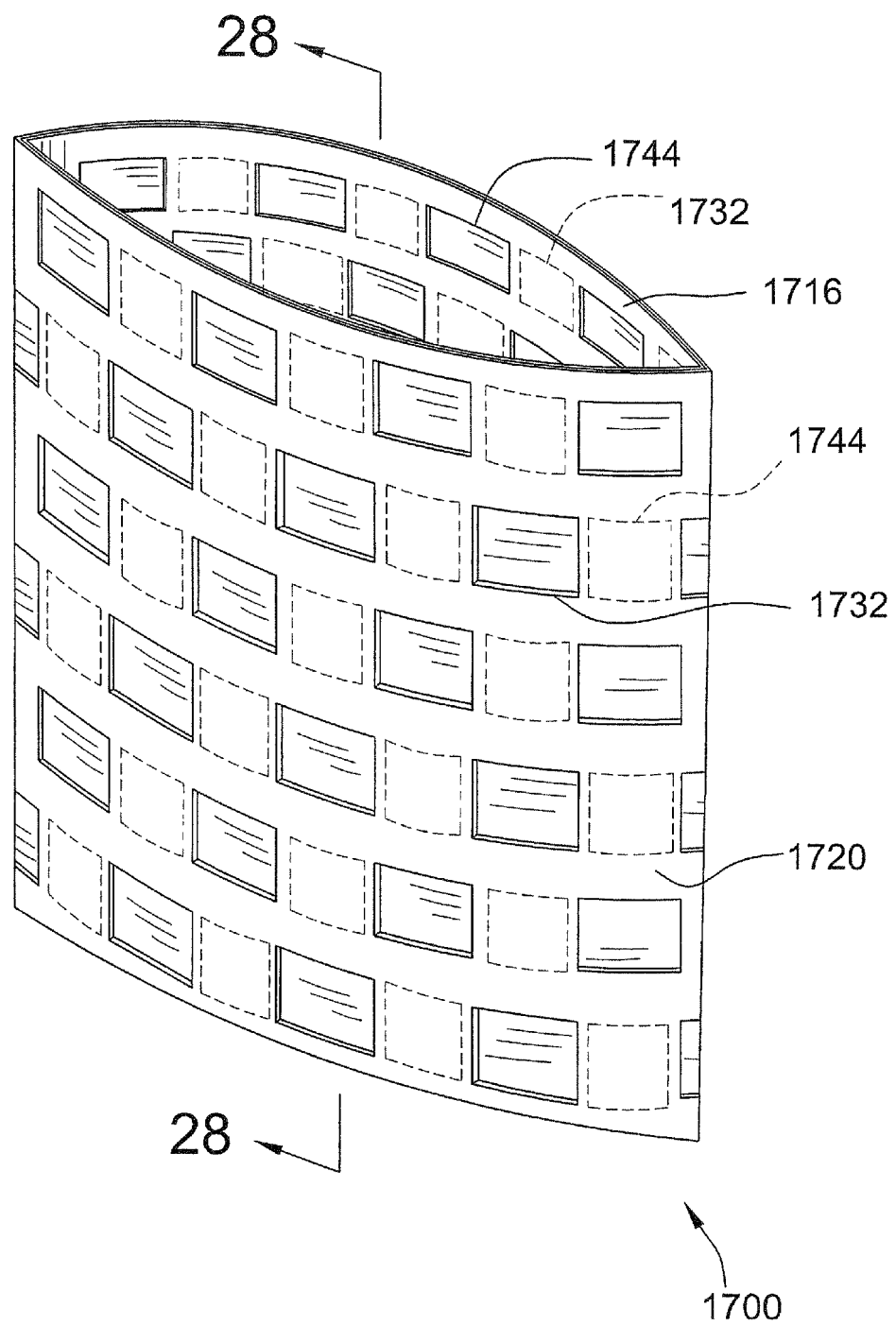
FIG. 27 is a perspective view of another embodiment of a microwavable bag.
Figure 28:
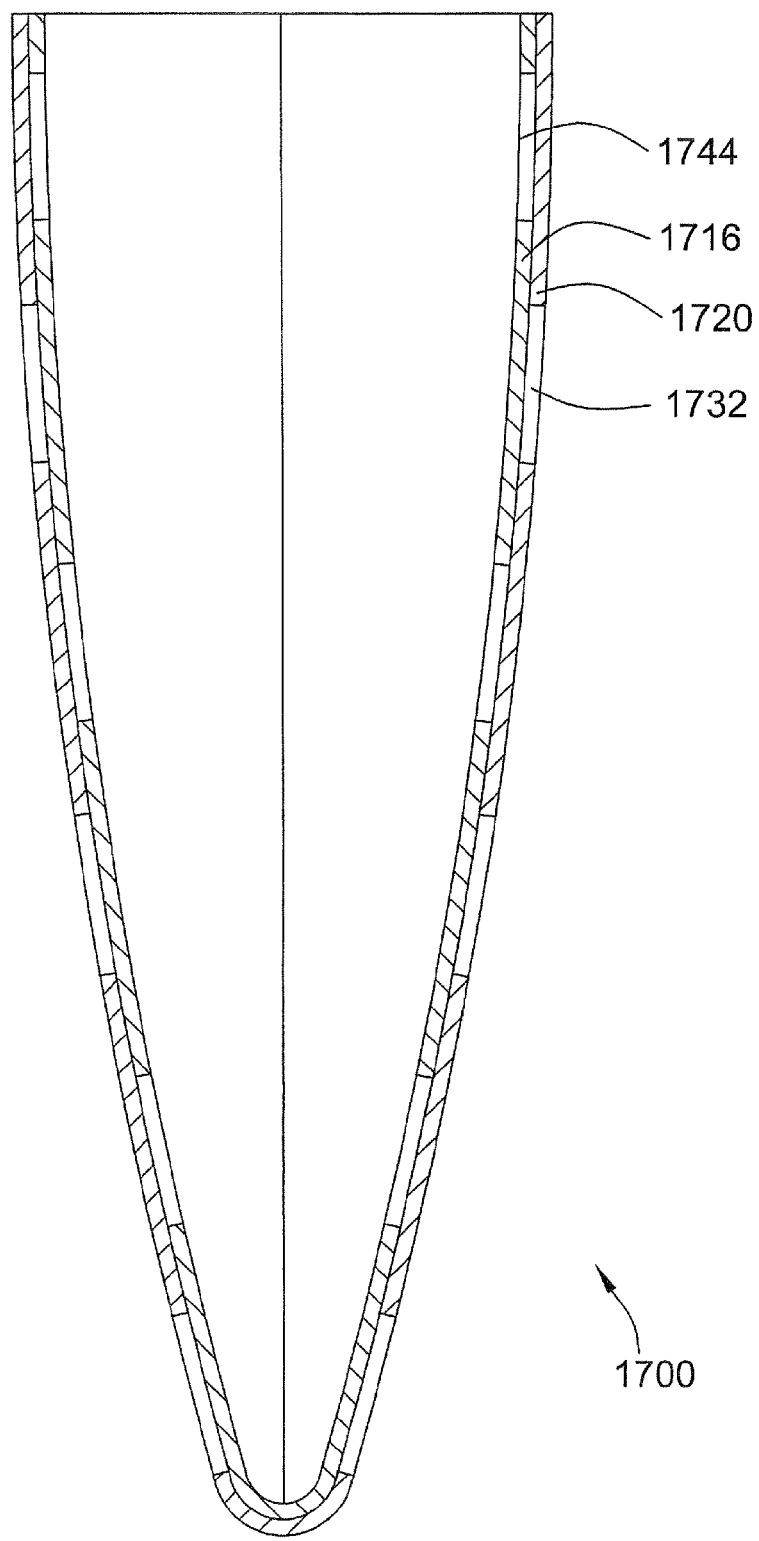
FIG. 28 is a cross-sectional view of a microwavable bag taken through line 28-28 of FIG. 27.

In another embodiment, as shown in FIGS. 25 and 26, the interior layer 1616 (or the interior layer and the susceptor layer) of the bag 1600 may have one or more apertures 1644 to expose the substrate layer 1620 to the interior of the bag 1600 such that moisture therein may be absorbed away from a food item when cooking. Furthermore, if the substrate material 1620 is permeable, the apertures 1644 may provide vents for steam to exit from the interior of the bag 1600. Additionally, as shown in FIGS. 27 and 28, the bag 1700 may have apertures 1744 in the interior layer 1716 (or interior layer and susceptor layer) such as in the embodiment shown in FIGS. 25 and 26 to permit the selective exposure of the substrate layer 1720 for moisture absorption while also having apertures 1732 as in FIGS. 7-10 in the substrate layer 1720 to enhance the ability of the bag 1700 to conform around food items. As shown, the apertures 1744 in the interior layer 1716 are disposed at alternate positions than the apertures 1732 in the substrate layer 1720. It will be appreciated, however, that any apertures may pass through all of the layers to provide for moisture venting as described in further detail below. It will be appreciated that any suitable number of apertures may be provided and the apertures may be of any suitable size and may be disposed at any suitable location.

Figure 29:
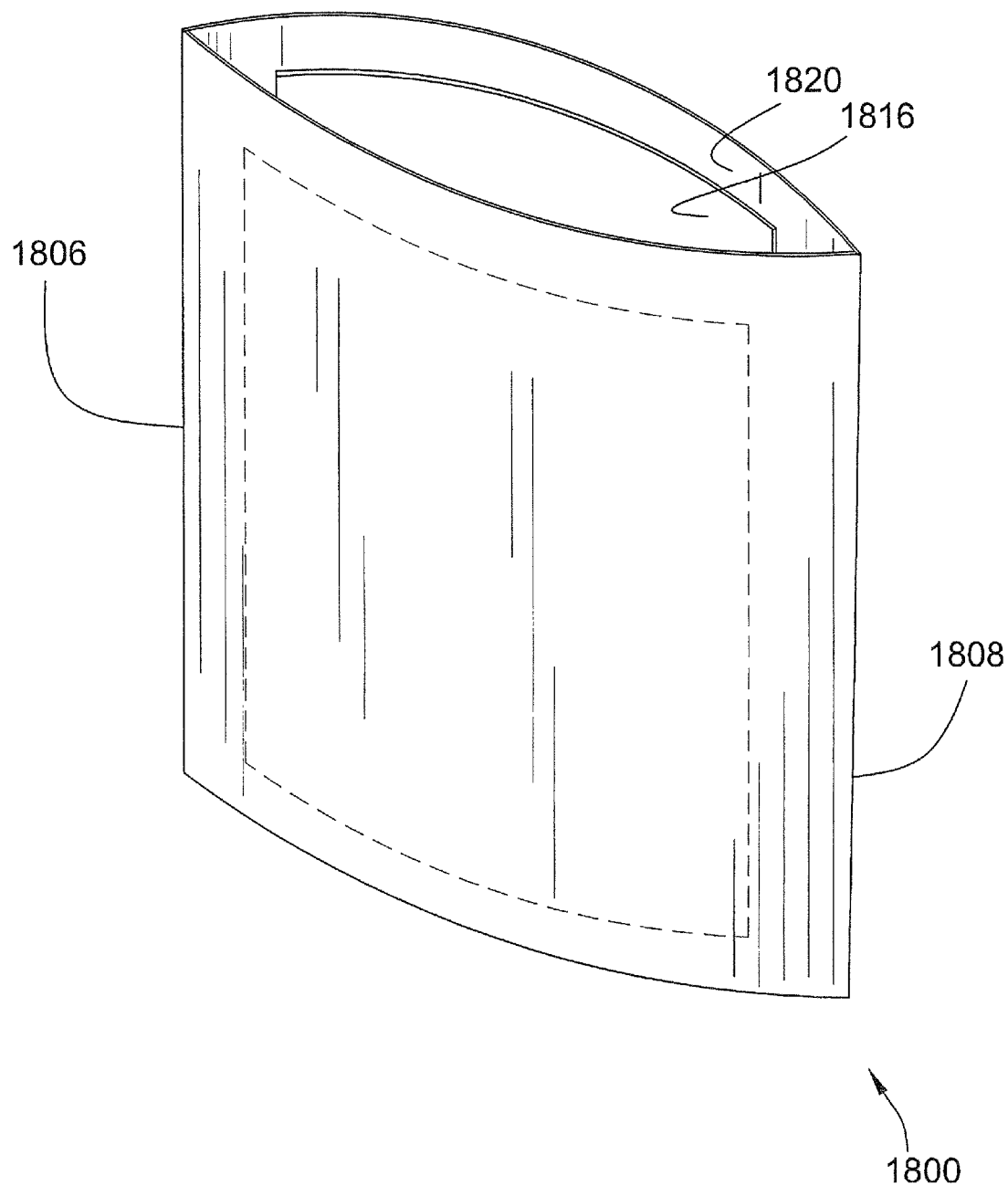
FIG. 29 is a perspective view of another embodiment of a microwavable bag.

In yet another embodiment of a bag, the susceptor material may be of a suitable size for applying an appropriate amount of heat to a food item while enabling the ability to wick away moisture from the food item. For example, as shown in FIG. 29, the interior layer 1816 may be of a size that is smaller than the substrate layer 1820. As shown, the interior layer 1816 is quadrilateral in shape and comprises a susceptor material. The substrate layer 1820 is constructed of an absorbent material. The absorbent material is exposed to the interior of the bag 1800 outside the perimeter of the interior layer 1816. Other than the moisture wicking provided by this embodiment, this embodiment also may reduce the cost of production because less susceptor material is needed. Furthermore, the edges 1806, 1808 of the bag may be more easily adhered to one another without extra layers near the edges 1806, 1808 of the bag 1800. It will be appreciated that the interior layer 1820 may be any suitable size and/or shape and may be disposed at any suitable location on the bag 1800.

Figure 30:
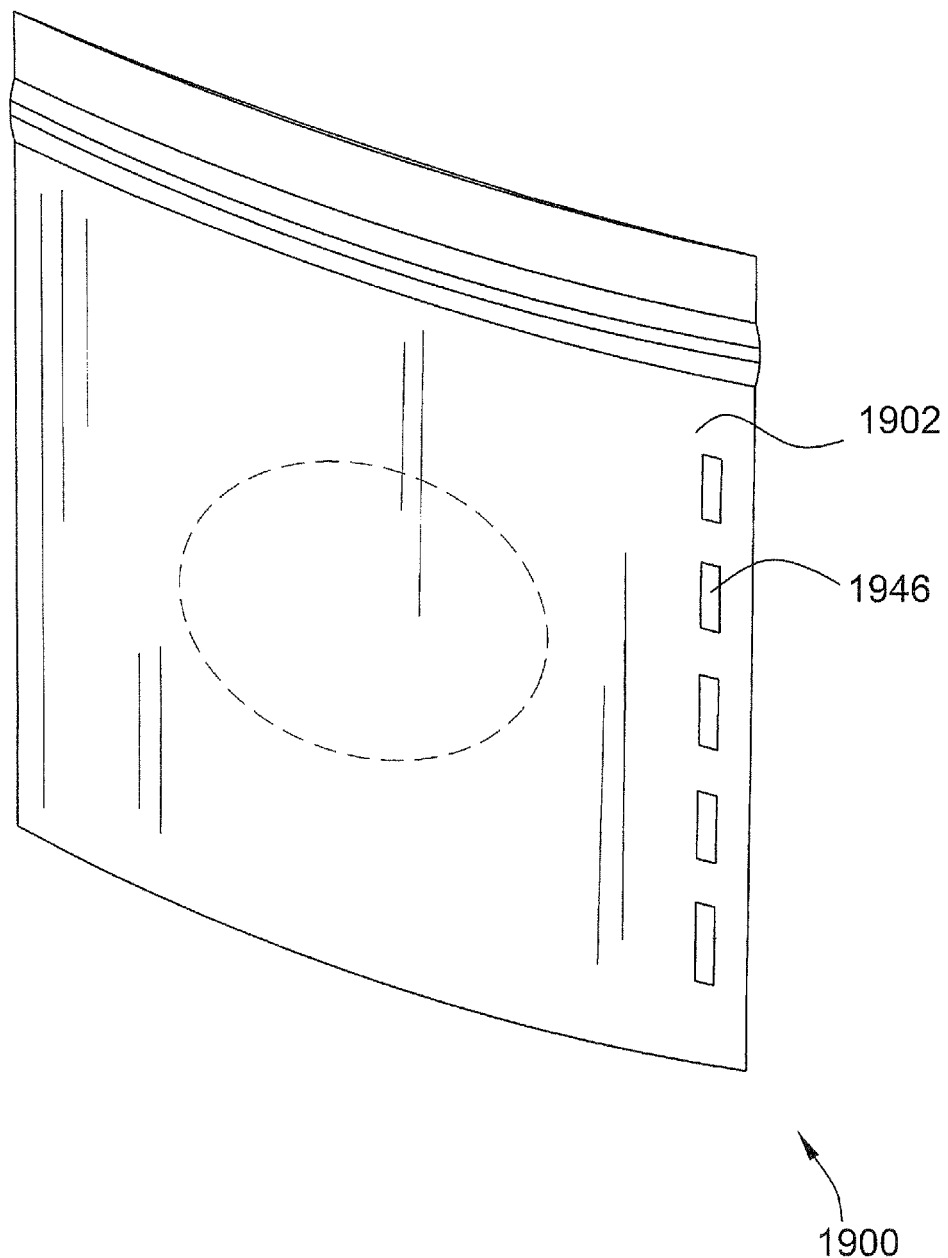
FIG. 30 is a perspective view of another embodiment of a microwavable bag.

It may be desirable in certain embodiments to provide an exit for any steam that may be released from a food item during cooking. This may be desirable to reduce any moisture buildup within the bag and/or allow air to exit the bag as the bag shrinks to conform around the food item. Thus, as shown in FIG. 30, the bag 1900 may have one or more vents 1946 through the layers of at least one sidewall (such as 1902) suitable for permitting the release of steam from the bag 1900. The bag 1900 may have any suitable number of vents 1946 disposed at any suitable location. Furthermore, the vents 1946 may be of any suitable size and/or shape.

Figure 31:
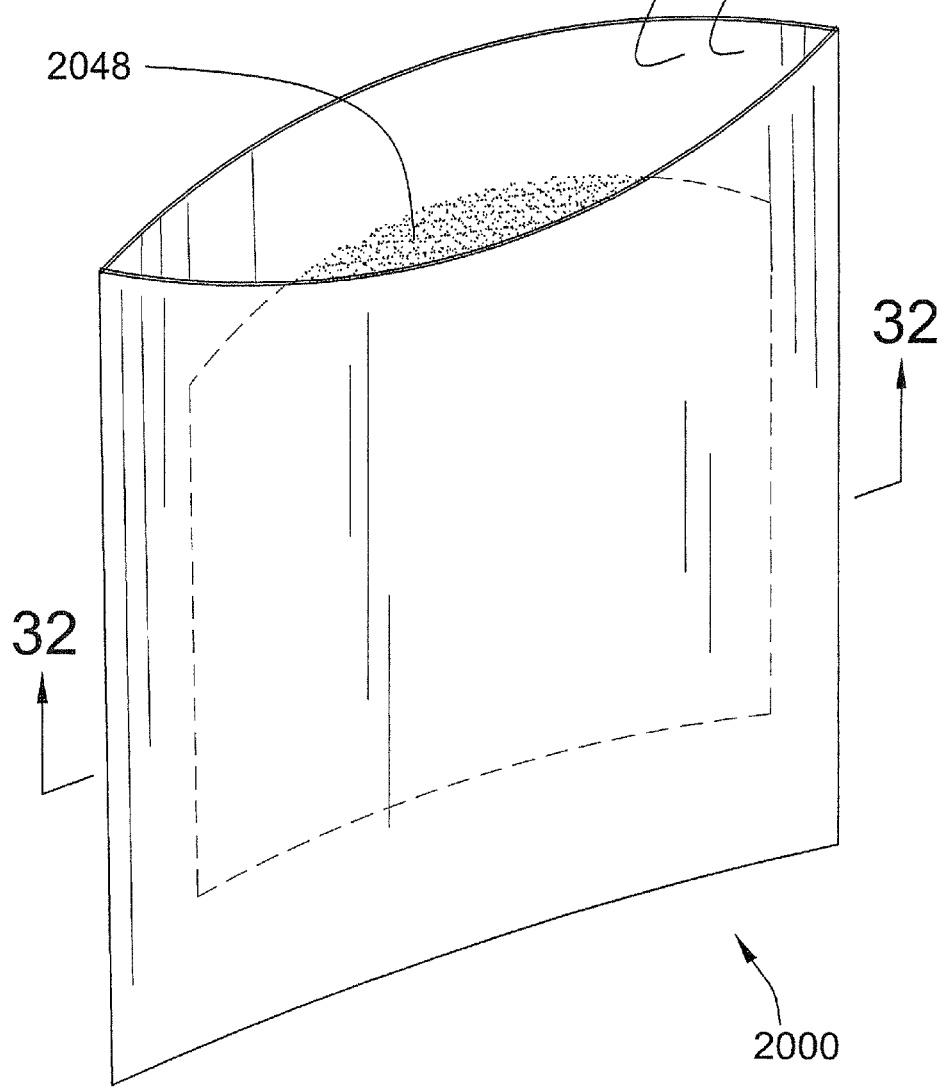
FIG. 31 is a perspective view of another embodiment of a microwavable bag.
Figure 32:
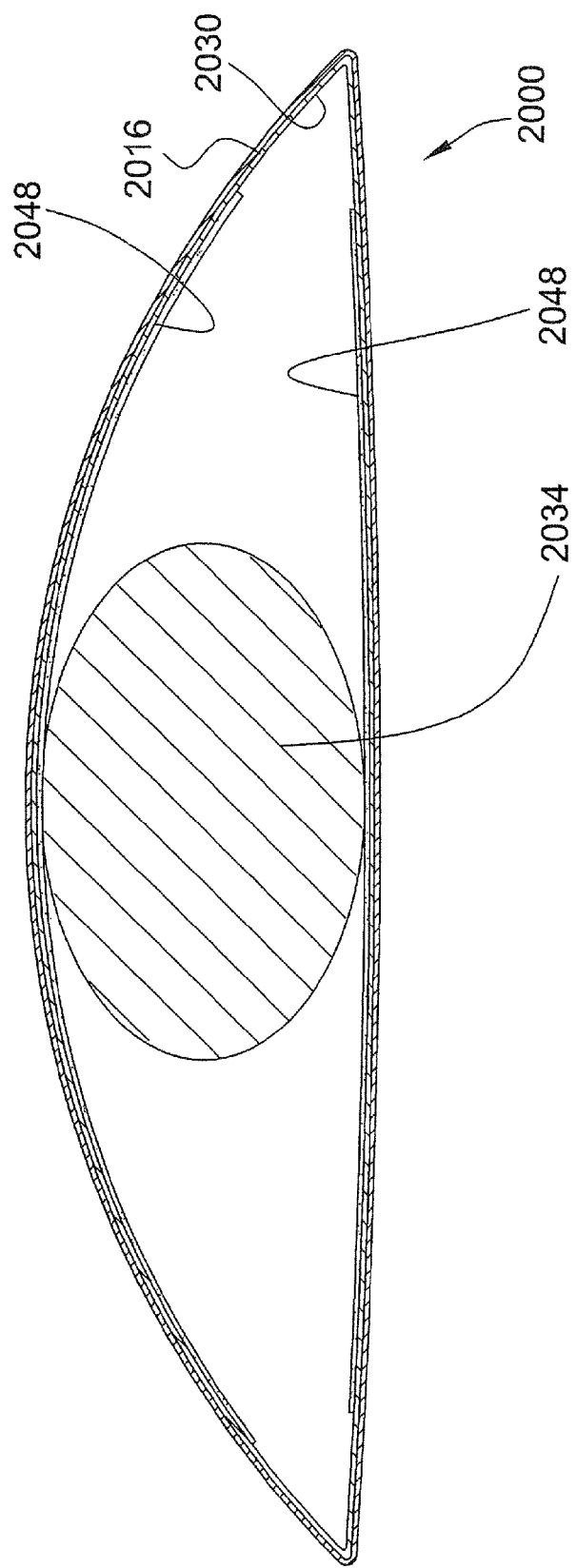
FIG. 32 is a cross-sectional view of a microwavable bag taken through line 32-32 of FIG. 31.

Turning to FIGS. 31 and 32, the bag 2000 may be provided with a coating 2048 disposed along at least a portion of the interior of the bag 2000. Even if the interior layer 2016 has properties that generally resist adherence to a food item 2034, certain food items 2034 may still have a tendency to stick to the interior of the bag 2000. Furthermore, in certain embodiments, it may be desirable to have a substance disposed on the interior of the bag 2000 to add flavoring (such as butter or seasoning) or to assist in the browning (creating a malliard reaction, for example) of the food item 2034. As another example, it may be desirable in some embodiments to have a suitable coating for cauterizing the outside surface of the food item 2034 to reduce water activity at the surface, and thus, improving the effect of the susceptor to brown and season the food item 2034.

The coating 2048 may be any material suitable for resisting the attachment of a food item with the interior surface of the bag and is safe for consumption. In addition, the coating 2048 may be any material suitable for adding flavoring and/or enhancing browning/cooking of a food item 2034 disposed within the bag 2000. The coating 2048 may attach at least partially to the food item 2034. The coating 2048 may be sprayed onto the inner surface 2030 of the interior layer 2016 of the bag 2000 via any suitable process, and may or may not be visible to a consumer. By way of example and not limitation, the coating 2048 may comprise a binding agent plus high fructose corn syrup solids and sodium bicarbonate. In certain embodiments, the coating 2048 may provide sufficient browning such that a susceptor material may be omitted from the bag.

Figure 39:
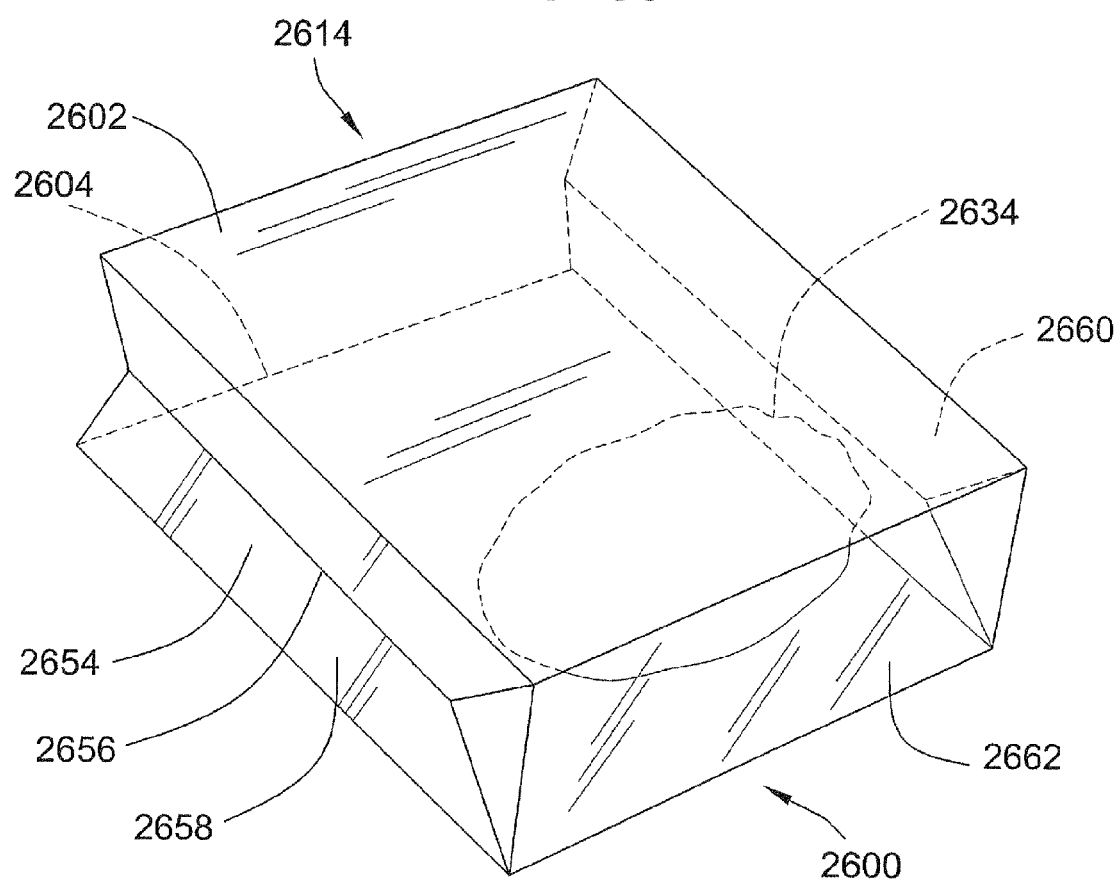
FIG. 39 is a rear perspective view of another embodiment of a microwavable bag.

Another embodiment of a microwave bag 2600 is shown in FIG. 39. In this embodiment, the microwave bag 2600 may comprise one or more gusseted surfaces 2654 disposed between a first sidewall 2602 and a second sidewall 2604. The gussets 2654 may be generally triangular in shape formed by a fold 2656 in the center of the gusset 2654. The gussets 2654 permit the bag 2600 to have additional flexibility to expand when a food item 2634 is disposed therein. As the first sidewall 2602 and second sidewall 2604 are moved away from one another, the gussets 2654 allow for expansion of the bag 2600 to contain a food item 2634. In the illustrated embodiment, the side surfaces 2658, 2660 are gusseted. In other embodiments, the rear side 2662 opposing the mouth 2614 of the bag 2600 (i.e., the bottom depending on the orientation of the bag 2600), may alternatively or additionally be gusseted. It will be appreciated, however, that the bag 2600 may have any suitable number of gusseted surfaces 2654 of any suitable shape disposed at any suitable location(s) on the bag 2600.

Figure 40:
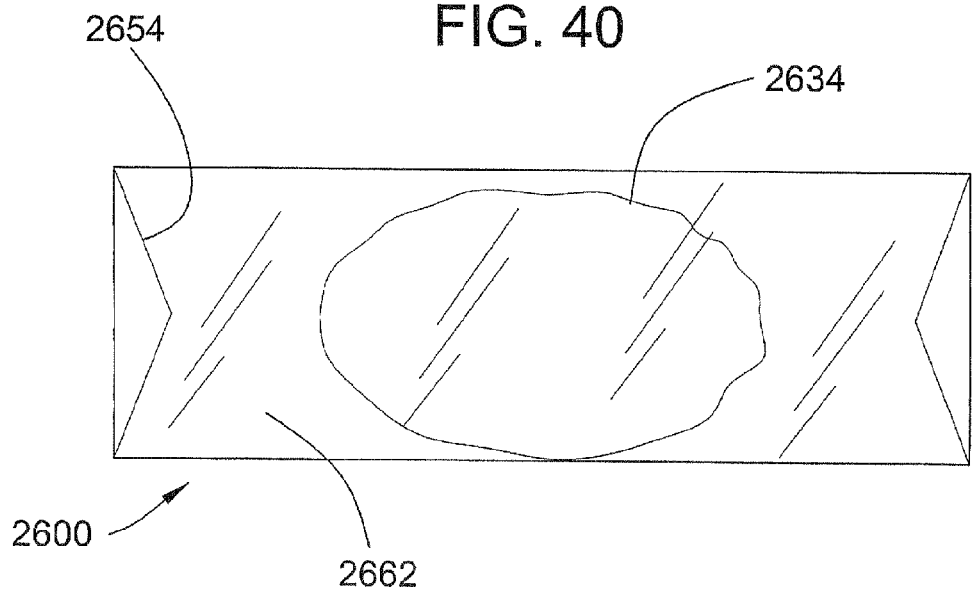
FIG. 40 is a rear elevational side view of the microwavable bag of FIG. 39 shown with a food item disposed therein.

In some embodiments, the bag may have one or more transparent portions permitting a consumer to view the interior of the bag. These transparent portions permit a consumer to view a food item once it has been placed into the bag. As shown in FIG. 40, the rear surface 2662 of the bag 2600 may be transparent. A user may look through the rear surface 2662 and observe the food item 2634 prior to placing the bag 2600 in the microwave oven. Thus, if a seasoning is disposed within the bag 2600, then the user may view the food item 2634 while the food item 2634 is marinating. For example, the consumer may observe the progress of a cold temperature release adhesive releasing seasoning on the food item 2634 without the need to open the bag 2600. In other embodiments, the transparent portions may be on the gusseted side surfaces 2654. In further embodiments, the transparent portions may be disposed at other suitable locations on the bag 2600.

Figure 41:
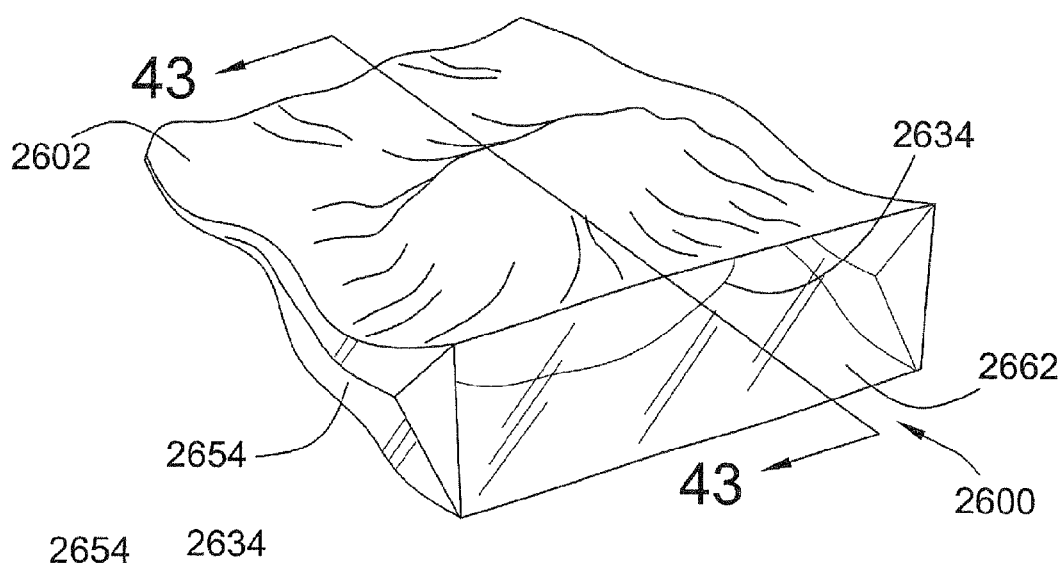
FIG. 41 is a rear perspective view of the microwavable bag of FIG. 39 after microwaving and shown with a food item disposed therein.
Figure 42:
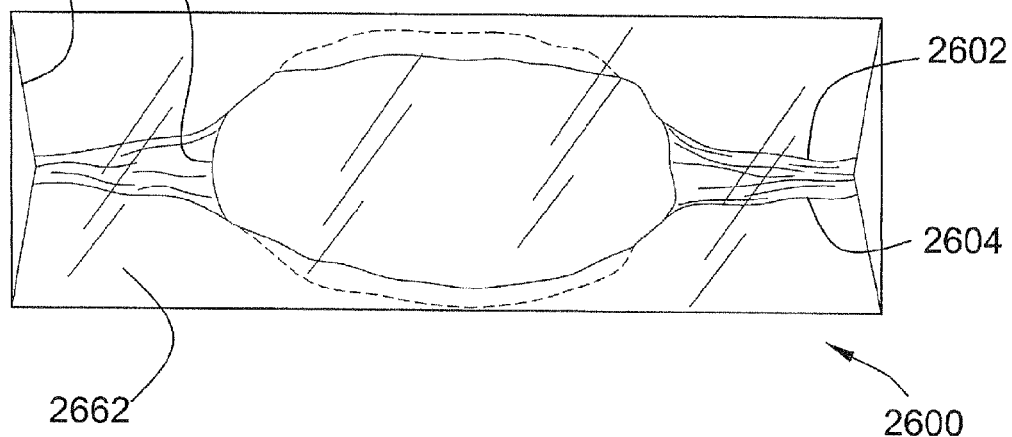
FIG. 42 is a rear elevational side view of the microwavable bag of FIG. 39 after microwaving and shown with a food item disposed therein.
Figure 43:
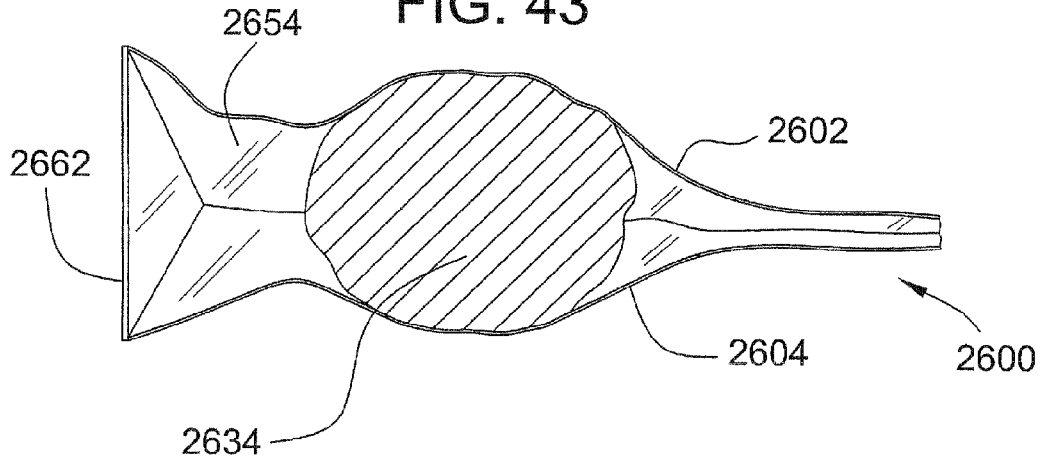
FIG. 43 is a cross-sectional view taken through line 43-43 of FIG. 41.

As shown in FIGS. 41-43, during the microwave cooking process, the gusseted surfaces 2654 may shrink to pull the first and second sidewalls 2602, 2604 around the food item 2634 to conform the bag 2600 around the food item 2634. As discussed above, this conformance enables close contact of the susceptor material with an increased surface area of the food item 2634 to improve the food item's cooking and browning characteristics. The gusseted surfaces 2654 may be formed of a material with enhanced shrinking characteristics to permit this conformance. For example, the gusseted surface 2654 may be constructed of a plastic material that may be selectively oriented/stretched in a desirable manner or pattern to enhance shrinking characteristics.

Furthermore, in some embodiments, such as shown in FIG. 42, the transparent portion(s) permit a consumer to observe the food item 2634 while the food item 2634 is cooking in the microwave oven. This enables the consumer to monitor the cooking, browning, and crisping of the food item 2634 during the microwave process. Thus, the consumer has the ability to monitor the cooking of a food item 2634, such as through the rear surface 2662, without opening a closure or removing the food item 2634 from the bag 2600. This is desirable because opening the bag 2600 or removing the food item 2634 may be a messy endeavor, may ruin the conformance of the bag 2600, and may affect the cooking process by releasing heat and/or moisture from the bag 2600 The transparent portions may be disposed or oriented (biaxially or otherwise selectively oriented) to permit shrinking to achieve conformance while maintaining a window to permit viewing of at least a portion of the interior of the bag 2600 during or after conformance from the cooking process.

Turning back to FIG. 41, it may be desirable in other embodiments to have gusseted surfaces 2654 on the sides of the bag 2600 with different shrinking characteristics than the transparent rear surface 2662 of the bag 2600. In this way, the sides 2658, 2660 may have enhanced shrinking characteristics to provide close conformance around a food item 2634 while the rear of the bag 2600 maintains a window for viewing the food item 2634 disposed therein. For example, the rear surface 2662 of the bag 2600 may be constructed of a material with a thicker gauge such that the rear surface 2662 resists conformance or conforms at a lesser rate than the gusseted surfaces 2654.

Some examples of suitable materials for forming the gusseted and/or transparent portions include, but are not limited to, polyethylene terephthalate (PET), polypropylene (PP), or polyethylene (PE). It will be appreciated, however, that any suitable material may be used.

It will be appreciated that the first and second sidewalls 2602, 2604 may have any suitable structure sufficient to achieve conformance when cooking a food item in a microwave oven, including but not limited to, any suitable embodiments described or incorporated by reference herein.

Figure 33:
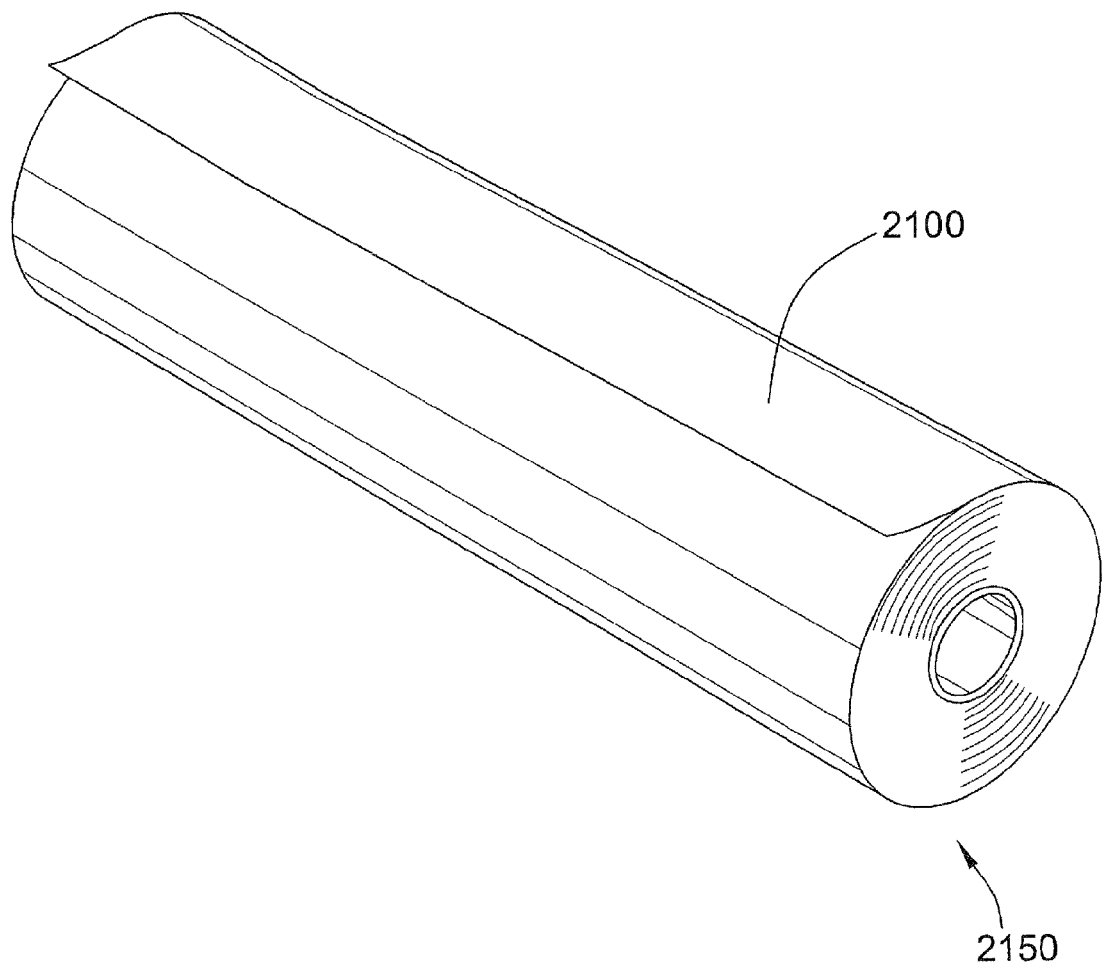
FIG. 33 is a perspective view of a roll of microwavable film.

It will be appreciated that although the embodiments described herein are described with respect to application with a bag, the embodiments described above may be incorporated into a roll 2150 and dispensed as a sheet material 2100 as shown in FIG. 33. The sheet material 2100 may be cut to a desired size or the roll 2150 may be pre-perforated to tear at the perforations for dispensing sheets of sheet material 2100 of a predetermined size. The sheet material 2100 may be wrapped around a food item to cook the food item in a microwave oven.

Figure 34:
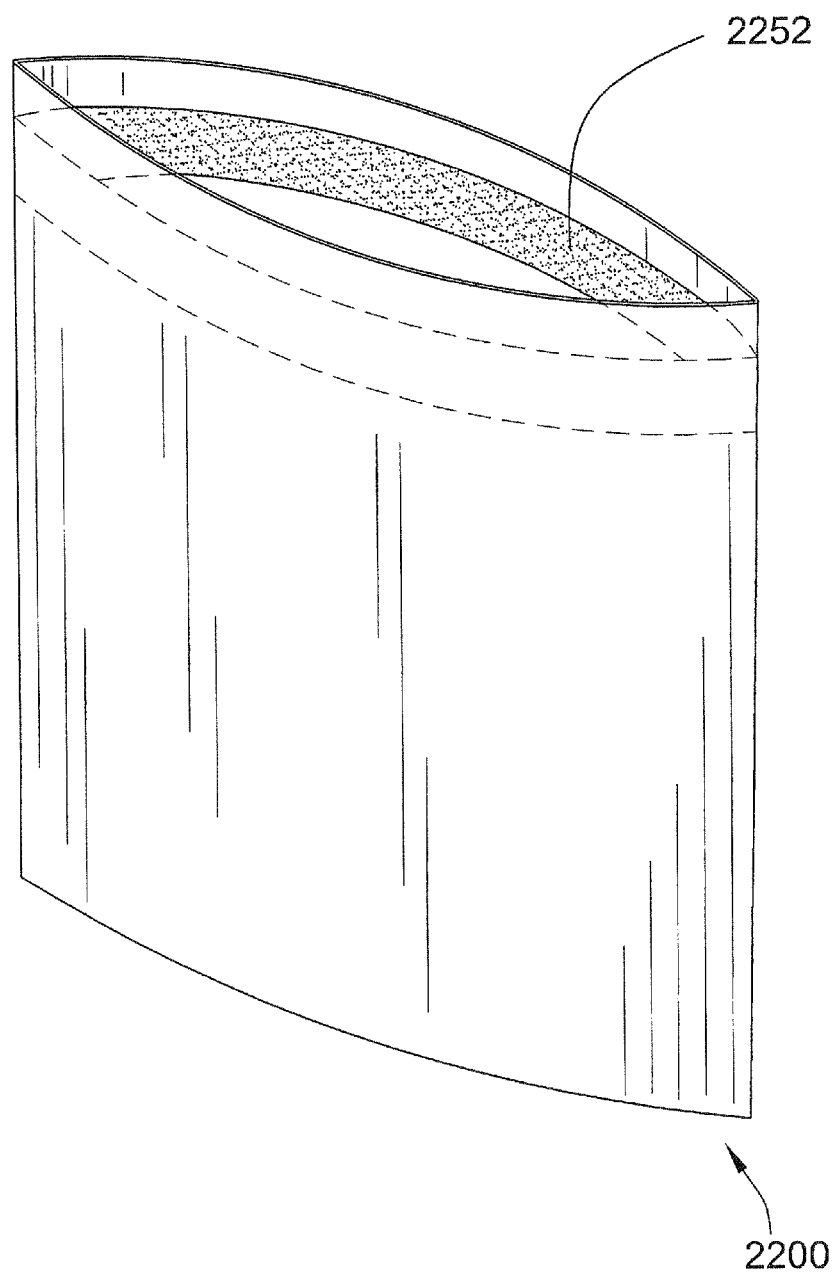
FIG. 34 is a perspective view of a microwavable bag with an embodiment of a closure.
Figure 35:
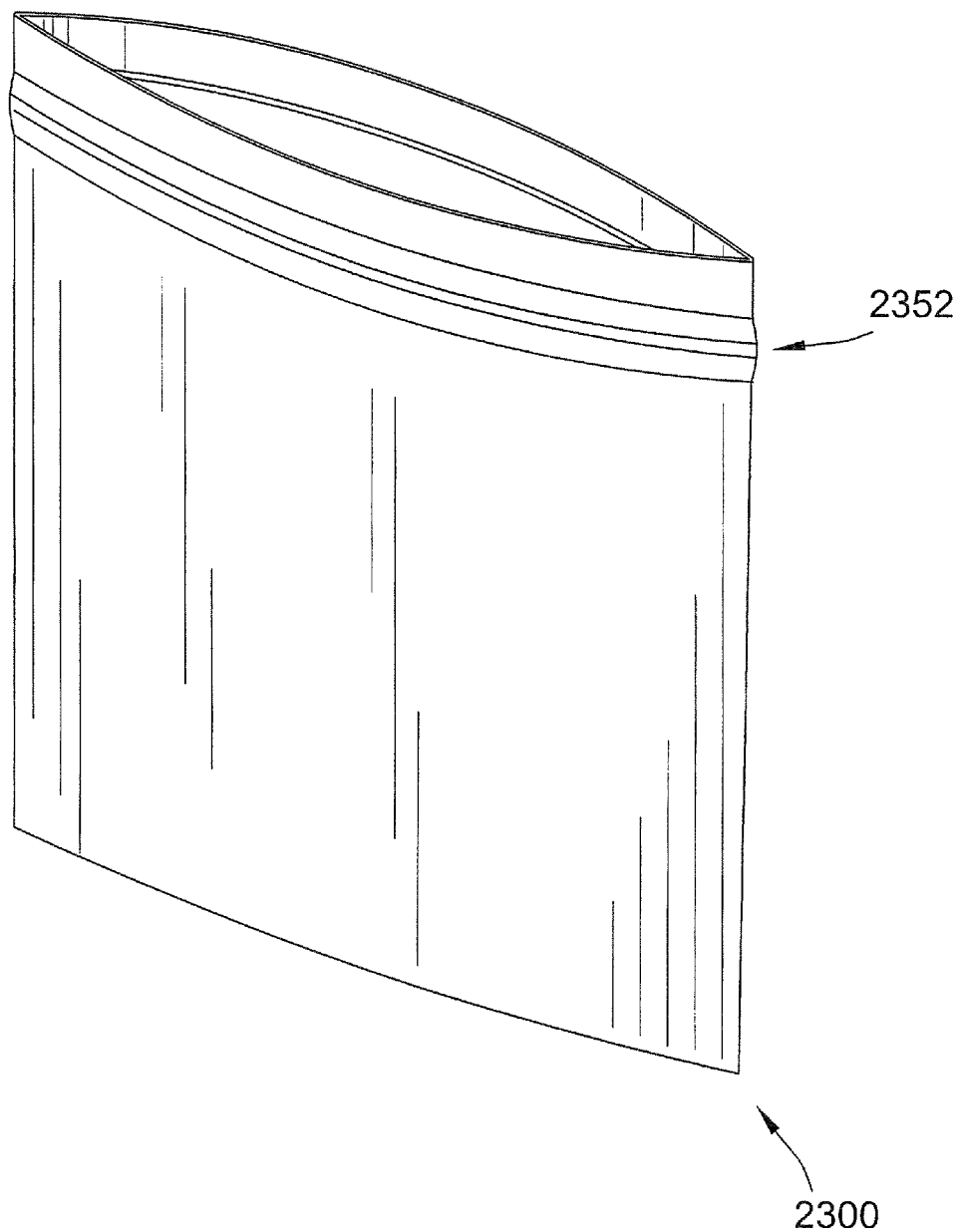
FIG. 35 is a perspective view of a microwavable bag with an embodiment of a closure.
Figure 36:
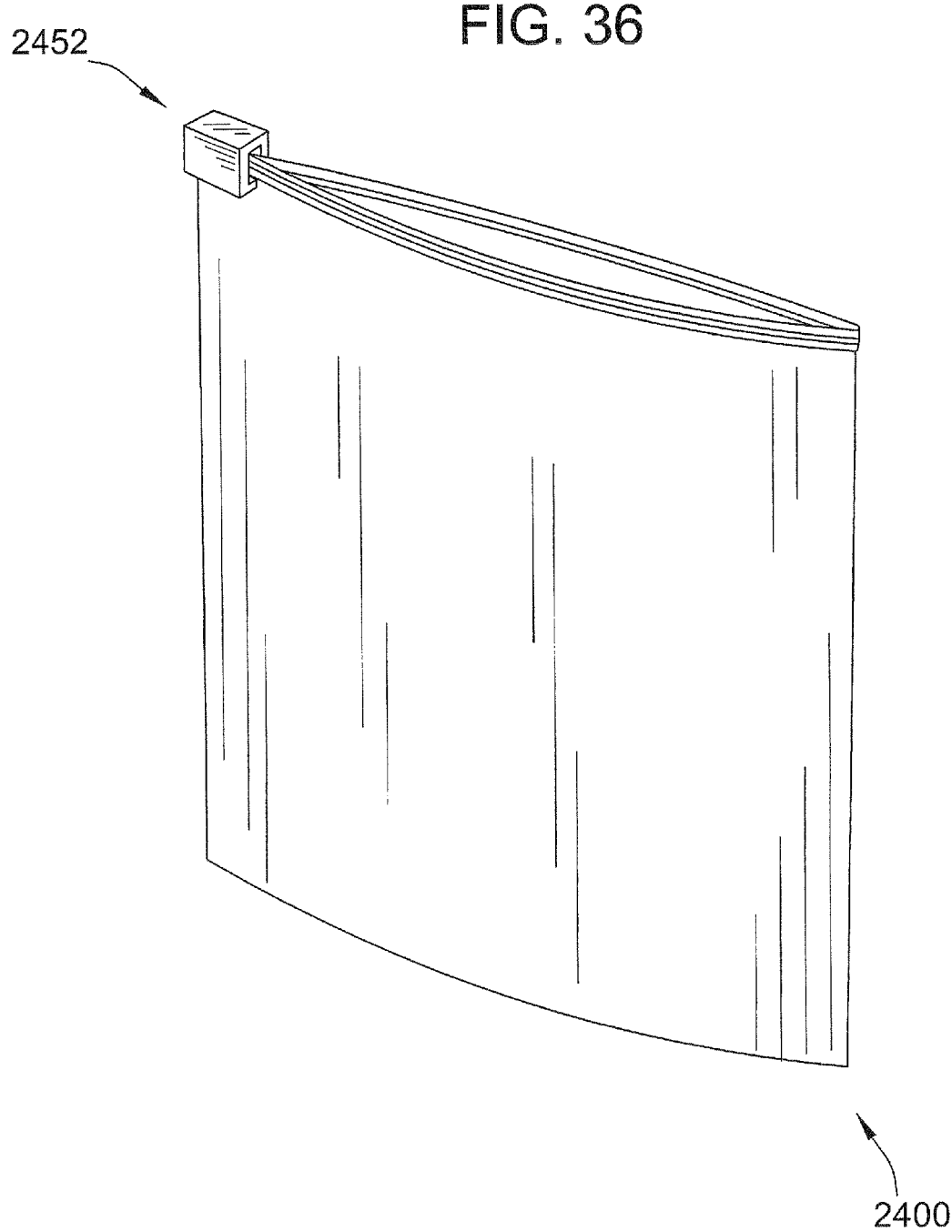
FIG. 36 is a perspective view of a microwavable bag with an embodiment of a closure.

As shown in certain embodiments described above, the bag may have an open mouth. In some embodiments, a closure may be provided to permit the bag to be sealed to enclose any food items contained therein. For example, as shown in FIG. 34, an adhesive closure 2252 for sealing a bag 2200 is shown. The adhesive closure 2252 may be either releasable such that the closure 2252 may be opened or closed at the user's discretion or the adhesive may be of a suitable strength such that it is not releasable and requires the user to tear or cut the film to access the interior of the bag 2200 after sealing. It will be appreciated that any suitable closure may be utilized including, but not limited to, the fastening strip type closure 2352 shown with the bag 2300 of FIG. 35 and the slider type closure 2452 shown with the bag 2400 of FIG. 36.

Figure 37:
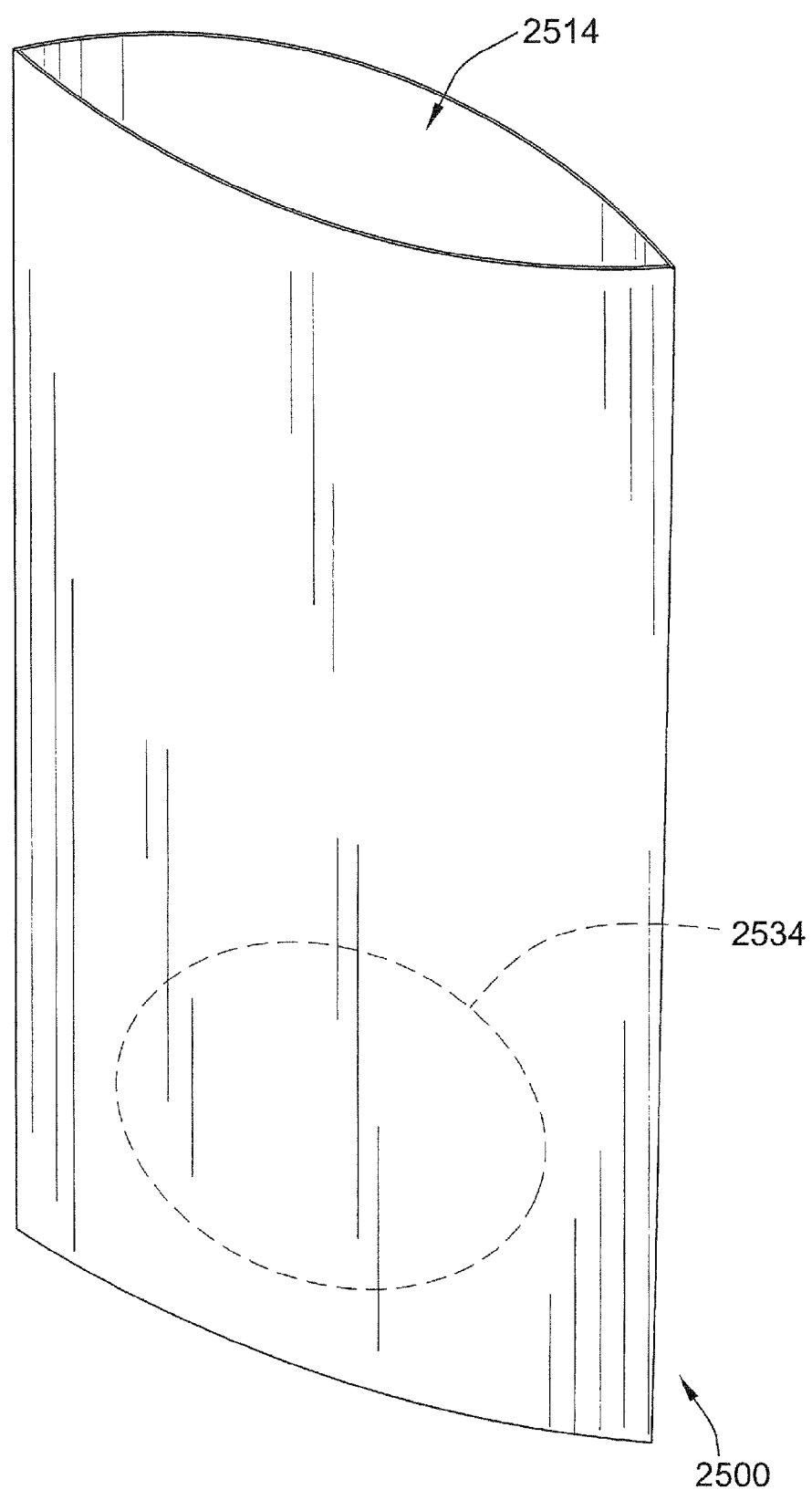
FIG. 37 is a perspective view of another embodiment of a microwavable bag.
Figure 38:
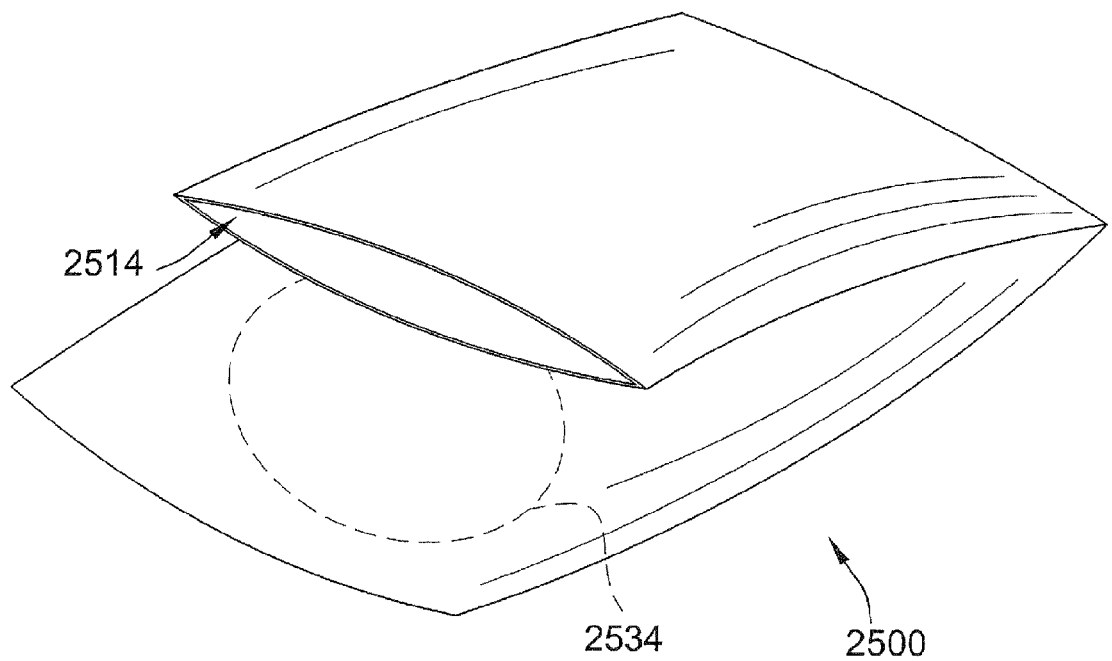
FIG. 38 is a perspective view of the microwavable bag of FIG. 37 shown in a folded configuration.

Turning to FIG. 37, another closure feature is shown. As described above, certain food items 2534 may release moisture during the cooking process or liquid may be added to the bag 2500 by the consumer. The bag 2500 may have a structure that prevents this liquid from exiting the bag 2500 during the cooking process and soiling the consumer's microwave oven. In this embodiment, the bag 2500 may be of a suitable size such that the open mouth 2514 of the bag 2500 may be folded over the portion of the bag 2500 containing the food item 2534 as shown in FIG. 38. In this way, any liquid is prevented from exiting through the open mouth 2514. During the cooking process, the bag 2500 may shrink and conform around the item 2534 helping to further resist any passage of fluid through the fold and out of the open mouth 2514.

It will be appreciated that the substrate layer may comprise any suitable material including, but not limited to, a woven or non-woven material, paper, foam material, or paperboard substrate.

The susceptor layer/material may be constructed of any suitable material, including but not limited to, a metal, metal alloy, or metal oxide. The susceptor layer/material may be provided as a metal foil, vacuum deposited on a surface, sputtered onto a surface, applied as an ink or paste, or any combination thereof.

It will be further appreciated that the bag or sheet material may comprise a seasoning adhered to the interior surface and/or may comprise a compartment with a releasable bond line such as is disclosed in U.S. Application No. 60/804,755, filed Jun. 14, 2006, (492.682, LVM 242086) and titled SEASONING BAG, which is incorporated in its entirety herein.

A microwavable bag/sheet material is disclosed herein that is suitable for cooking a food item in a microwave. The bag/sheet material may have characteristics that provide for improved crisping and browning of a food item. It will be appreciated that any suitable embodiments described or incorporated by reference herein may be utilized in combination.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor(s) for carrying out the invention. Variations of those preferred embodiments may become apparent to those of ordinary skill in the art upon reading the foregoing description. The inventor(s) expect skilled artisans to employ such variations as appropriate, and the inventor(s) intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A container for cooking a food item in a microwave oven, the container comprising:
   a mouth for inserting the food item;
   a flexible thermoplastic container body having a first and second sidewall forming an interior, at least one of the first and second sidewalls having a microwave susceptor material for heating the food item in the microwave oven;
   wherein the first sidewall has a first film orientation with a tendency to heat shrink more readily along a first axis and the second sidewall has a second film orientation with a tendency to heat shrink more readily along a second axis; the second film orientation is different from the first film orientation such that the first axis is generally perpendicular to the second axis; and
   the first film is orientated in a transverse direction and the second film is orientated in a machine direction; and
   whereby upon heating in the microwave oven, the first film shrinks along the first axis in the transverse direction and the second film shrinks along the second axis in the machine direction;
   whereby upon heating in the microwave oven, the first and the second sidewall of the bag curl in both directions to form a bowl shape; and
   whereby upon heating in the microwave oven; the microwave susceptor material is brought into closer conformity with a contained food item for improved browning and crisping performance.

2. The container of claim 1 wherein the first sidewall has a thicker gauge than the second sidewall.

3. The container of claim 1 wherein the container is a bag and the bag is foldable at least partially over itself to form a closure.

4. The container of claim 3 wherein the container is a bag and the bag comprises a closure.

5. The container of claim 1 wherein the container is a sleeve.

6. The container of claim 1 wherein the microwave susceptor material is disposed in a pattern.

7. The container of claim 1 wherein the microwave susceptor material is disposed in a selective location in at least one of the first sidewall and the second sidewall.

8. The container of claim 1 further comprising a coating at least partially disposed on an interior surface of the container.

9. The container of claim 1 wherein the container comprises an aperture for releasing moisture from within the container.

* * * * *